(12) United States Patent
Stutzman et al.

(10) Patent No.: US 9,505,569 B2
(45) Date of Patent: *Nov. 29, 2016

(54) METHOD OF REDUCING SILICOSIS CAUSED BY INHALATION OF SILICA-CONTAINING PROPPANT, SUCH AS SILICA SAND AND RESIN-COATED SILICA SAND, AND APPARATUS THEREFOR

(71) Applicants: Scott S. Stutzman, Indiana, PA (US); Robert Sean Reininger, Nolensville, TN (US); David S. Balthaser, Indiana, PA (US)

(72) Inventors: Scott S. Stutzman, Indiana, PA (US); Robert Sean Reininger, Nolensville, TN (US); David S. Balthaser, Indiana, PA (US)

(73) Assignee: KSW ENVIRONMENTAL, LLC, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/686,383

(22) Filed: Apr. 14, 2015

(65) Prior Publication Data

US 2015/0259160 A1 Sep. 17, 2015

Related U.S. Application Data

(63) Continuation of application No. 14/209,478, filed on Mar. 13, 2014.

(51) Int. Cl.
| | | |
|---|---|---|
| B01D 45/00 | (2006.01) |
| B65G 69/18 | (2006.01) |
| B08B 15/00 | (2006.01) |
| B01D 46/00 | (2006.01) |
| B01D 46/10 | (2006.01) |
| B65D 85/68 | (2006.01) |
| B65D 83/06 | (2006.01) |
| B65D 88/54 | (2006.01) |
| B65B 3/04 | (2006.01) |

(52) U.S. Cl.
CPC ........... *B65G 69/18* (2013.01); *B01D 46/0023* (2013.01); *B01D 46/0036* (2013.01); *B01D 46/10* (2013.01); *B08B 15/00* (2013.01); *B08B 15/002* (2013.01); *B65D 83/06* (2013.01); *B65D 85/68* (2013.01); *B65D 88/54* (2013.01); *B65G 69/186* (2013.01); *B65B 3/04* (2013.01); *B65D 2581/00* (2013.01); *B65D 2585/00* (2013.01); *B65D 2588/00* (2013.01)

(58) Field of Classification Search
CPC .... B65G 69/18; B65G 69/186; B65D 83/06; B65D 88/54; B65D 85/68; B65D 2585/00; B65D 2588/00; B65D 2581/00; B08B 15/00; B08B 15/002

See application file for complete search history.

(56) References Cited

U.S. PATENT DOCUMENTS

| | | |
|---|---|---|
| 1,676,969 A | 7/1928 | Sutton et al. |
| 3,204,393 A | 9/1965 | Eklund |
| 3,314,098 A | 4/1967 | Carsey |
| 4,406,330 A | 9/1983 | Jysky |
| 4,434,861 A | 3/1984 | Howeth |
| 5,183,086 A | 2/1993 | Fanta et al. |
| 5,284,388 A | 2/1994 | Volk et al. |
| 5,518,048 A | 5/1996 | Derby |
| 5,538,286 A | 7/1996 | Hoff |
| 5,840,102 A | 11/1998 | McCracken |
| 5,940,926 A | 8/1999 | Inzinna et al. |

(Continued)

*Primary Examiner* — Dung H Bui
(74) *Attorney, Agent, or Firm* — Nils H. Ljungman & Associates

(57) ABSTRACT

A method of reducing silicosis caused by inhalation of silica-containing proppant, such as silica sand and resin-coated silica sand, and apparatus therefor.

20 Claims, 36 Drawing Sheets

(56) References Cited

U.S. PATENT DOCUMENTS

| | | |
|---|---|---|
| 6,065,922 A | 5/2000 | Kato et al. |
| 6,076,702 A | 6/2000 | Hoffmann et al. |
| 6,419,425 B1 | 7/2002 | Fourcroy et al. |
| 6,655,425 B2 | 12/2003 | Doerffel et al. |
| 6,666,628 B1 | 12/2003 | Tilley |
| 6,698,915 B2 | 3/2004 | Dearing et al. |
| 6,887,290 B2 | 5/2005 | Strauser et al. |
| 6,948,535 B2 | 9/2005 | Stegemoeller |
| 7,427,182 B2 | 9/2008 | Galijan |
| 7,635,011 B2 | 12/2009 | Harris |
| 7,703,518 B2 | 4/2010 | Phillippi et al. |
| 7,709,518 B2 | 5/2010 | Chen et al. |
| 7,846,399 B2 | 12/2010 | Albin |
| 7,926,564 B2 | 4/2011 | Phillippi et al. |
| 8,012,422 B2 | 9/2011 | Yaluris et al. |
| 2008/0277121 A1* | 11/2008 | Phillippi ............... E21B 21/062 166/310 |
| 2010/0111654 A1 | 5/2010 | Schroeder et al. |
| 2011/0162838 A1 | 7/2011 | Mackenzie et al. |
| 2011/0284027 A1 | 11/2011 | Logan et al. |
| 2012/0304860 A1 | 12/2012 | Matson |

\* cited by examiner

METHOD OF REDUCING SILICOSIS CAUSED BY INHALATION OF SILICA-CONTAINING PROPPANT, SUCH AS SILICA SAND AND RESIN-COATED SILICA SAND, AND APPARATUS THEREFOR

CONTINUING APPLICATION DATA

The present application is a Continuation of U.S. patent application Ser. No. 14/209,478, filed on Mar. 13, 2014, which is a Continuation-In-Part of U.S. patent application Ser. No. 13/606,913, filed on Sep. 7, 2012, which is a Continuation-In-Part of U.S. patent application Ser. No. 13/416,256, filed on Mar. 9, 2012, which claims the benefit of: U.S. Provisional Patent Application No. 61/601,875, filed Feb. 22, 2012, U.S. Provisional Patent Application No. 61/590,233, filed Jan. 24, 2012, and U.S. Provisional Patent Application No. 61/451,435, filed Mar. 10, 2011. U.S. patent application Ser. No. 14/209,478 is also a Continuation-In-Part of U.S. patent application Ser. No. 13/416,256. U.S. patent application Ser. No. 14/209,478 also claims the benefit of U.S. Provisional Patent Application No. 61/786,274, filed Mar. 14, 2013. U.S. patent application Ser. No. 13/606,913 also claims the benefit of U.S. Provisional Patent Application No. 61/601,875, and U.S. Provisional Patent Application No. 61/590,233.

BACKGROUND

1. Technical Field

The present application relates to a method of reducing silicosis caused by inhalation of silica-containing proppant, such as silica sand and resin-coated silica sand, and apparatus therefor.

2. Background Information

Hydraulic fracturing is the propagation of fractures in a rock layer, which process is used by oil and gas companies in order to release petroleum, natural gas, coal seam gas, or other substances for extraction. The hydraulic fracturing technique is known in the oil and gas industry as "fracking" or "hydrofracking." In hydraulic fracturing, a proppant is used to keep the fractures open, which proppant is often a silica-containing material, such as silica sand and resin-coated silica sand. Many tons of proppant are used at a fracking site, thereby exposing workers to inhalation of silica dust, which can lead to a lung disease known as silicosis, or Potter's rot. Silicosis is a form of occupational lung disease caused by inhalation of crystalline silica dust, and is marked by inflammation and scarring in forms of nodular lesions in the upper lobes of the lungs. It is a type of pneumoconiosis, or lung disease caused by the inhalation of dust, usually from working in a mining operation.

When preparing proppant for use in hydraulic fracturing, large amounts of dust, such as silica dust and other proppant dust, are created by the movement of proppants. This dust can produce potential detrimental effects, such as contaminating atmospheric air, creating a nuisance to adjacent landowners, and damaging equipment on the hydraulic fracturing site. A significant concern, as discussed above, is the inhalation of silica dust or other proppant dust, which can lead to lung conditions such as silicosis and other specific forms of pneumoconiosis.

Hydraulic fracturing jobs use a large amount of proppant, often as much as 15,000 tons. This large quantity of proppant is brought in by pneumatic tankers and then blown into proppant storage trailers known as "mountain movers," "sand hogs" or "sand kings." Some well-known storage devices of this type have been manufactured by Halliburton. These storage trailers have access doors on top which vent the incoming air to the atmosphere. The flow of air creates large dust clouds, such as silica dust clouds, which blow out of the access doors, which can be especially problematic for workers who are looking into the interior of the storage trailers to monitor the proppant fill level. The proppant is then gravity fed onto a conveyor belt that carries the proppant to another conveyor, usually a T-belt which runs transverse to and collects the proppant from multiple storage trailers. The gravity feed of the proppant once again disturbs the proppant resulting in additional dust clouds. The T-belt then carries the proppant to be discharged into the hopper of one or more blenders, at which point the proppant is again disturbed and additional dust clouds are created.

During this entire process, workers are often standing near or directly in the path of a cloud or airborne flow of silica dust or proppant dust. When small silica dust particles are inhaled, they can embed themselves deeply into the tiny alveolar sacs and ducts in the lungs, where oxygen and carbon dioxide gases are exchanged. The lungs cannot clear out the embedded dust by mucous or coughing. Substantial and/or concentrated exposure to silica dust can therefore lead to silicosis.

Some of the signs and/or symptoms of silicosis include: dyspnea (shortness of breath), persistent and sometimes severe cough, fatigue, tachypnea (rapid breathing), loss of appetite and weight loss, chest pain, fever, and gradual dark shallow rifts in nails which can eventually lead to cracks as protein fibers within nail beds are destroyed. Some symptoms of more advanced cases of silicosis could include cyanosis (blue skin), cor pulmonale (right ventricle heart disease), and respiratory insufficiency.

Aside from these troublesome conditions, persons with silicosis are particularly susceptible to a tuberculosis infection known as silicotuberculosis. Pulmonary complications of silicosis also include chronic bronchitis and airflow limitation (similar to that caused by smoking), non-tuberculous Mycobacterium infection, fungal lung infection, compensatory emphysema, and pneumothorax. There is even some data revealing a possible association between silicosis and certain autoimmune diseases, including nephritis, scleroderma, and systemic lupus erythematosus. In 1996, the International Agency for Research on Cancer (IARC) reviewed the medical data and classified crystalline silica as "carcinogenic to humans."

In all hydraulic fracturing jobs, a wellbore is first drilled into rock formations. A hydraulic fracture is then formed by pumping a fracturing fluid into the wellbore at a rate sufficient to increase pressure downhole to exceed that of the fracture gradient of the rock to be fractured. The rock cracks and the fracture fluid continues farther into the rock, thereby extending the crack or fracture. To keep this fracture open after the fluid injection stops, the solid proppant is added to the fluid. The fracturing fluid is about 95-99% water, with the remaining portion made up of the proppant and chemicals, such as hydrochloric acid, methanol propargyl, polyacrylamide, glutaraldehyde, ethanol, ethylene glycol, alcohol and sodium hydroxide. The propped fracture is permeable enough to allow the flow of formation fluids to the well, which fluids may include gas, oil, salt water, fresh water and fluids introduced during completion of the well during fracturing. The proppant is often a silica-containing material, such as sand, but can be made of different materials, such as ceramic or other particulates. These materials are selected based on the particle size and strength most suitable to handle the pressures and stresses which may occur in the fracture. Some types of commercial proppants are available from Saint-Gobain Proppants, 5300 Gerber Road, Fort Smith, Ark. 72904, USA, as well as from Santrol Proppants, 50 Sugar Creek Center Boulevard, Sugar Land, Tex. 77478, USA.

The most commonly used proppant is silica sand or silicon dioxide ($SiO_2$) sand, known colloquially in the industry as "frac sand." The frac sand is not just ordinary sand, but rather is chosen based on certain characteristics according to standards developed by the International Organization for Standardization (ISO) or by the American Petroleum Institute (API). The current ISO standard is ISO 13503-2:2006, entitled "Petroleum and natural gas industries—Completion fluids and materials—Part 2: Measurement of properties of proppants used in hydraulic fracturing and gravel-packing operations," while the API standards are API RP-56 and API RP-19C. In general, these standards require that the natural sands must be from high silica (quartz) sandstones or unconsolidated deposits. Other essential requirements are that particles are well rounded, relatively clean of other minerals and impurities and will facilitate the production of fine, medium and coarse grain sands. Frac sand is preferably >99% quartz or silica, and high purity quartz sand deposits are relatively common in the U.S. However, the tight specifications for frac sands—especially in relation to roundness and sphericity—make many natural sand deposits unsuitable for frac sand production. One primary source of such high quality sand is the St. Peter sandstone formation, which spans north-south from Minnesota to Missouri and east-west from Illinois into Nebraska and South Dakota. Sand from this formation is commercially known as Ottawa sand. This sand generally is made of a very high percentage of silica, and some samples, such as found in Missouri, consist of quartz sand that is 99.44% silica.

One characteristic used to determine suitability of a proppant material, such as silica sand, is grain size, which can be measured using standard length measurements or by mesh size. Mesh size is determined by the percentage of particles that are retained by a series of mesh sieves having certain-sized openings. In a mesh size number, the small number is the smallest particle size while the larger number is the largest particle size in that category. The smaller the number, the coarser the grain. The vast majority of grains range from 12 to 140 mesh and include standard sizes such as 12/20, 16/30, 20/40, 30/50, and 40/70, whereby 90% of the product falls between the designated sieve sizes. Some specific examples are 8/12, 10/20, 20/40, and 70/140. Grain size can also be measured in millimeters or micrometers, with some examples being grain size ranges of 2.38-1.68 mm, 2.00-0.84 mm, 0.84-0.42 mm, and 210-105 micrometers.

Another important characteristic of a proppant material, such as silica sand, for hydraulic fracturing is the sphericity and roundness of the grains, that is, how closely the grains conform to a spherical shape and its relative roundness. The grains are assessed by measuring the average radius of the corners over the radius of a maximum inscribed circle. Krumbein and Sloss devised a chart for the visual estimation of sphericity and roundness in 1955, as shown in FIG. 4. The API, for example, recommends sphericity and roundness of 0.6 or larger based on this scale.

An additional characteristic of a proppant material, such as silica sand, is crush resistance, which, as the phrase implies, is the ability of the proppant to resist being crushed by the substantial forces exerted on the proppant after insertion into a fracture. The API requires that silica sand withstand compressive stresses of 4,000 to 6,000 psi before it breaks apart or ruptures. The tested size range is subjected to 4,000 psi for two minutes in a uniaxial compression cylinder. In addition, API specifies that the fines generated by the test should be limited to a maximum of 14% by weight for 20-40 mesh and 16-30 mesh sizes. Maximum fines for the 30-50 mesh size is 10%. Other size fractions have a range of losses from 6% for the 70-40 mesh to 20% for the 6-12 mesh size. According to the anti-crushing strength measured in megapascals (MPa), types of frac sand can possibly be divided, for example, into 52 Mpa, 69 Mpa, 86 Mpa and 103 Mpa three series.

Yet another characteristic of a proppant material, such as silica sand, is solubility. The solubility test measures the loss in weight of a 5 g sample that has been added to a 100 ml solution that is 12 parts hydrochloric acid (HCl) and three parts hydrofluoric acid (HF), and heated at 150° F. (approx. 65.5° C.) in a water bath for 30 minutes. The test is designed to determine the amount of non-quartz minerals present. However, a high silica sandstone or sand deposit and its subsequent processing generally removes most soluble materials (e.g. carbonates, iron coatings, feldspar and mineral cements). The API requires (in weight percent) losses of <2% for the 6-12 mesh size through to the 30-50 mesh size and 3% for the 40-70 mesh through to 70-140 mesh sizes.

Object or Objects

An object of the present application is to prepare proppant, such as silica sand, resin-coated silica sand, and ceramic proppant materials, for use in hydraulic fracturing while minimizing dust production in order to reduce exposure of workers to silica dust and proppant dust, and thereby minimize the chances of the workers developing silicosis or other types of pneumoconiosis.

SUMMARY

As discussed above, in a hydraulic fracturing operation, large quantities (as much as 15,000 tons or more) of proppant, such as silica sand, resin-coated silica sand, and ceramic proppant materials, are used. One of the drawbacks of using proppant materials, especially silica sand, is that dust clouds, such as silica dust clouds, are formed during the handling of the proppant material. The dust clouds can be controlled by using a control arrangement. According to one possible embodiment of the application, the control arrangement is separate from but connectable to the proppant storage device. According to another possible embodiment of the application, at least a portion of the control arrangement is integrated into the body of the proppant storage device.

DESCRIPTION OF EMBODIMENT OR EMBODIMENTS

Figure 1:
FIG. 1 shows a microscopic view of silica dust particles.
Figure 2:
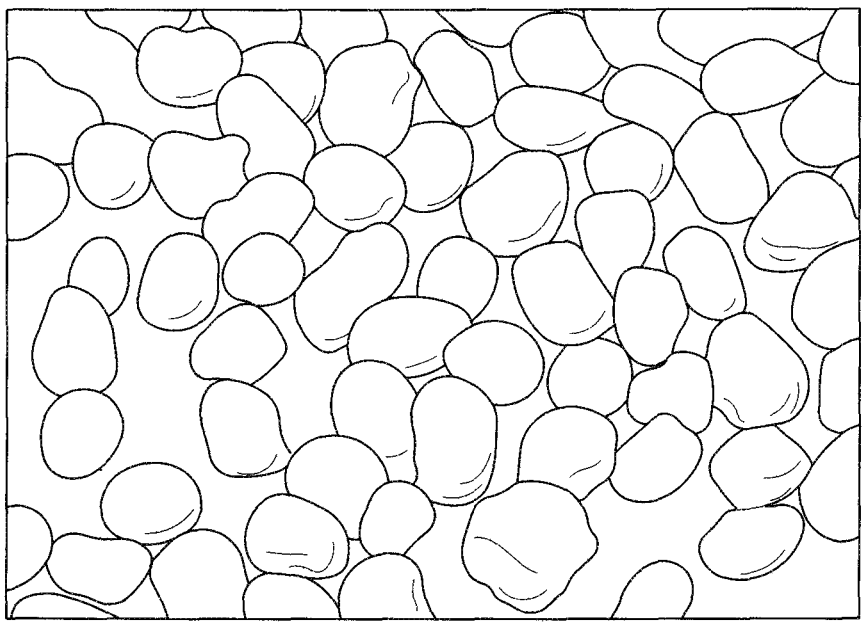
FIG. 2 shows proppant grains.
Figure 3:
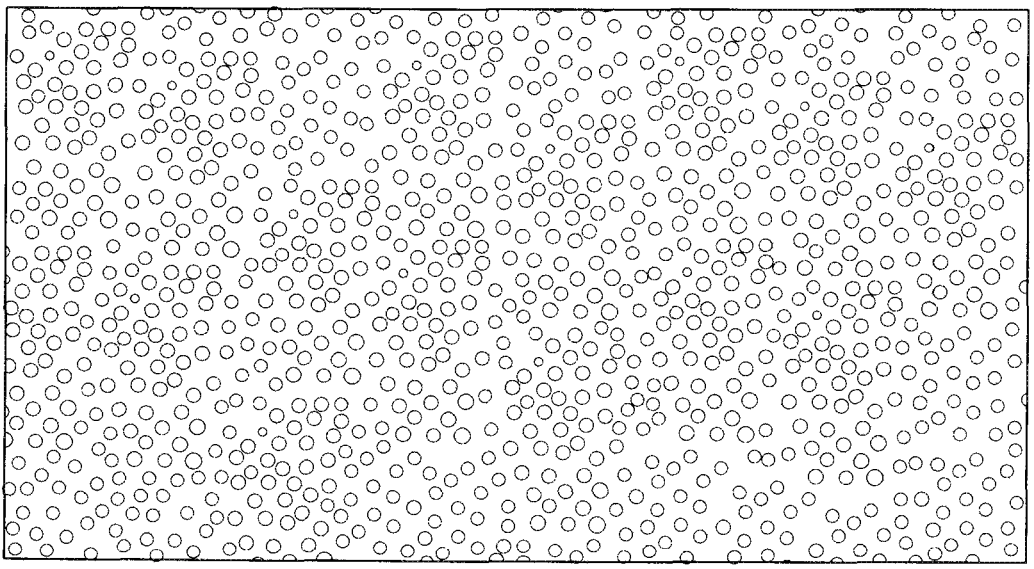
FIG. 3 shows proppant grains.
Figure 4:
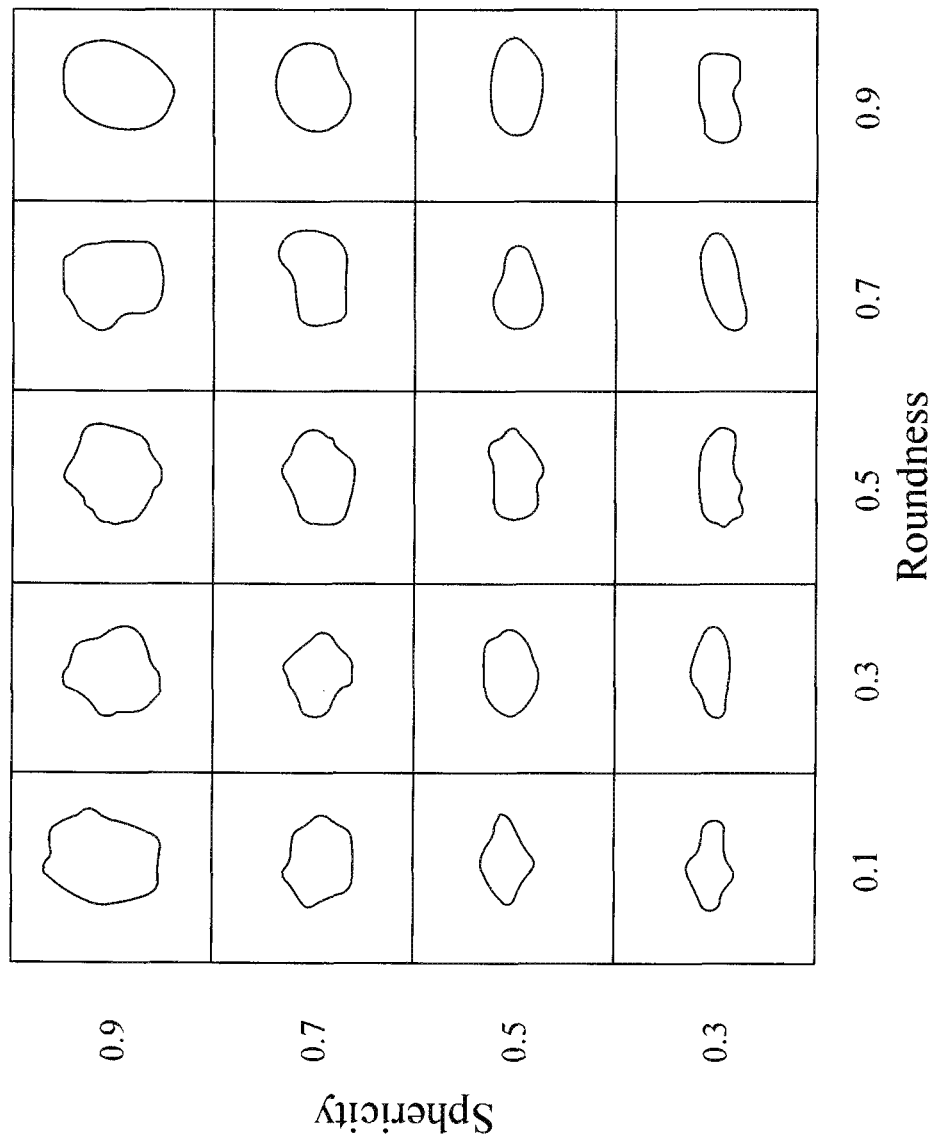
FIG. 4 shows the Krumbein and Sloss chart.
Figure 5:
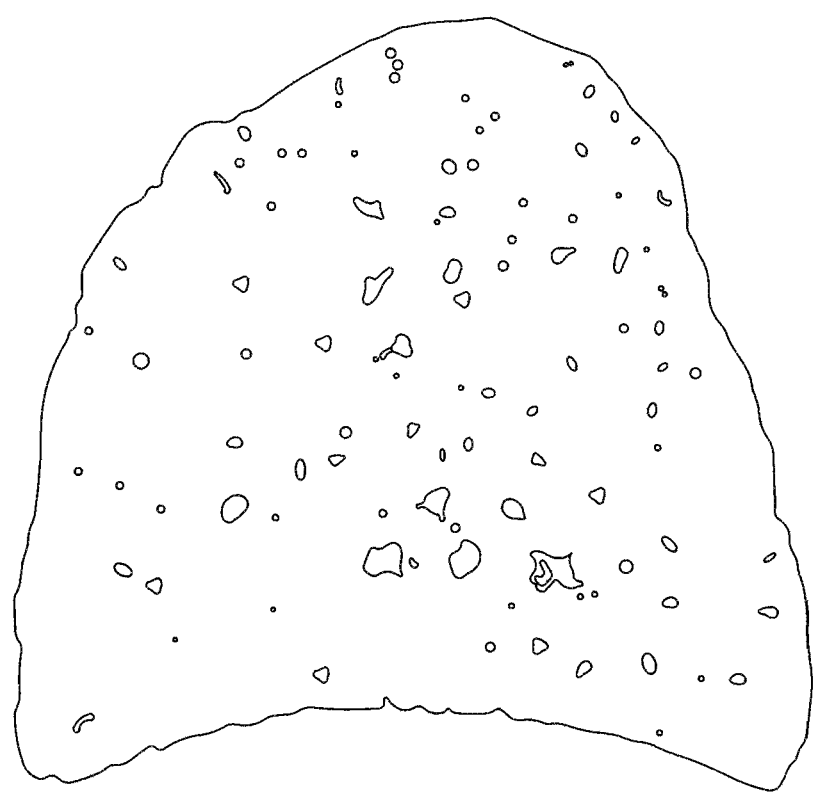
FIG. 5 shows a human lung affected by silicosis.

FIG. 1 shows a microscopic view of silica dust particles. These silica dust particles can become lodged in the lungs of a person who inhales the silica dust. Exposure to silica dust may lead to silicosis, a form of pneumoconiosis. FIGS. 2 and 3 show examples of proppant grains. FIG. 5 shows a human lung affected by silicosis. As can be easily seen, the lung is darkened and damaged by the presence of the silica dust particles.

Figure 6:
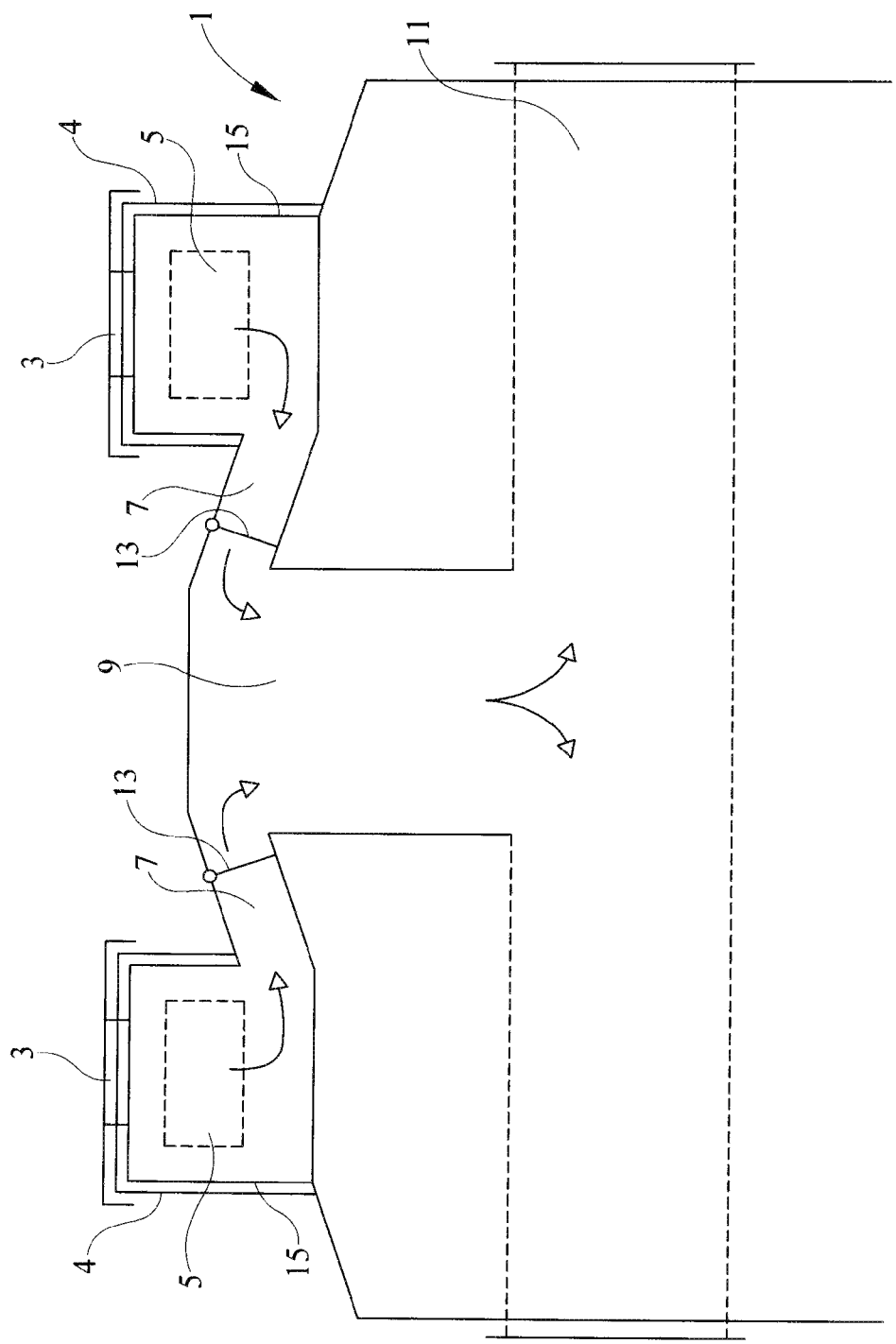
FIG. 6 shows a cross-sectional end view of a portion of the body of a proppant storage device according to at least one embodiment of the application.

FIG. 6 shows a cross-sectional end view of a portion of the body of a proppant storage device 1 according to at least one embodiment of the application. While the storage device 1 is being filled with proppant, the doors 3, which are shown in FIG. 6 as being closed, may be opened to allow air to vent through outlets 4 and to allow workers to monitor the fill level of proppant in the storage device 1. The exiting air and the feeding of the proppant disturb the proppant, causing the formation of dust clouds which exit via the outlets 4, regardless of whether the doors 3 are closed or opened. To minimize or prevent the spread or exit of these dust clouds, a vacuum suction system may be employed. In operation, a vacuum dust collection machine is connected via an air duct system to collect the dust. In FIG. 6, intake openings 5 are formed in the sides of the outlets 4. A junction duct 15 is located around the intake opening 5 and connects to a side air duct 7. The flow of air through the side air duct 7 can be controlled by a valve 13. The side air ducts 7 lead to a central air duct 9. The central air duct 9 ultimately leads to an exhaust duct 11, which is operatively connected to a dust collector (not shown). The flow of air therefore proceeds as follows: air is drawn in through the outlets 4, then through the intake openings 5, then through the side air ducts 7, then through the central air duct 9, and finally through the exhaust duct 11. The side air ducts 7, the central air duct 9, and the exhaust duct 11 may be located within the frame or body of the storage device 1.

Figure 7:
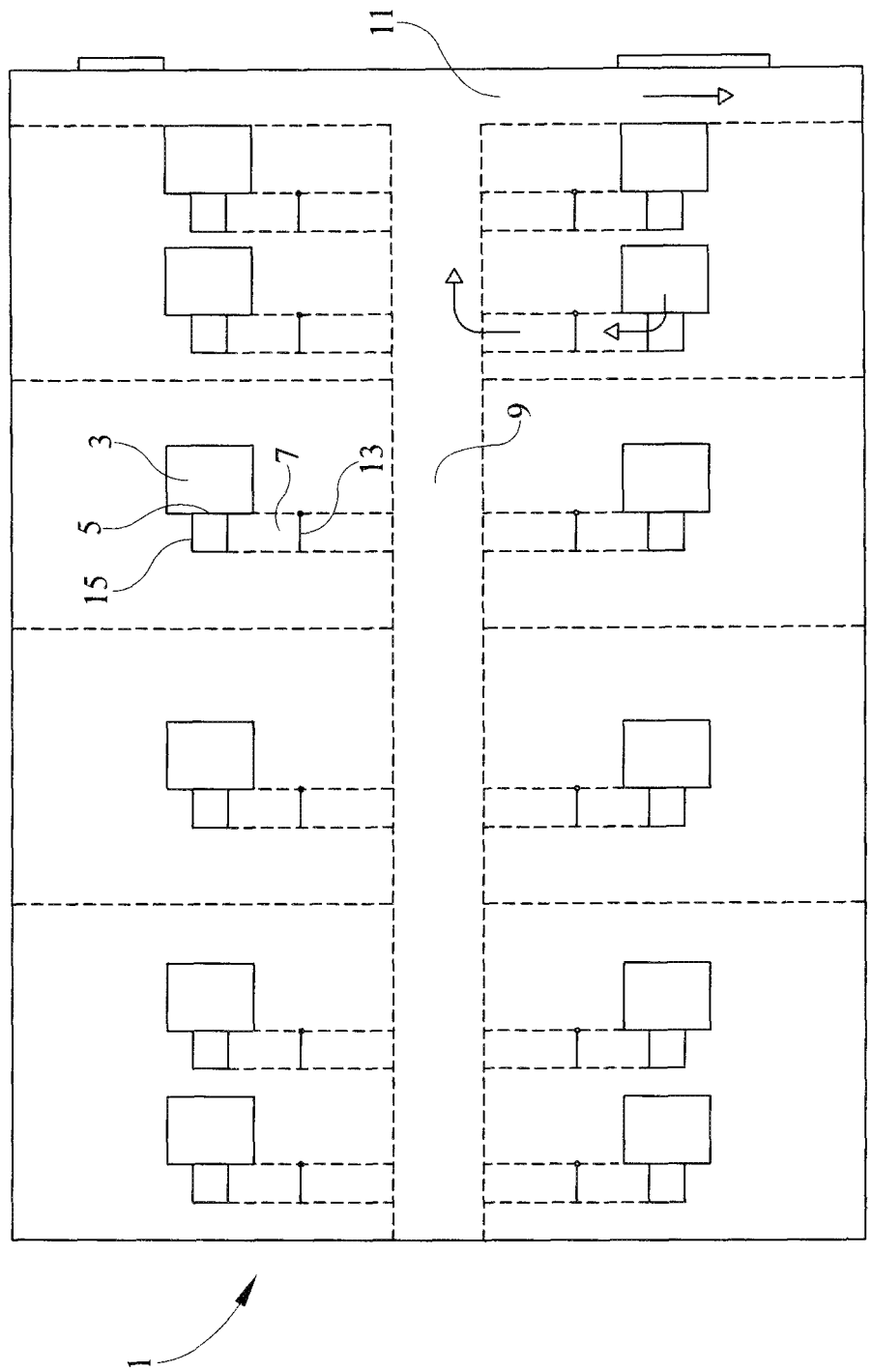
FIG. 7 shows a top view of a portion of the body of the proppant storage device according to FIG. 6.

FIG. 7 shows a top view of a portion of the body of the storage device 1 according to FIG. 6. As can be seen in this figure, each of the side air ducts 7 connects to the central air duct 9, which, in the embodiment shown, extends over the length of the storage device 1 before joining the exhaust duct 11 located at the rear of the storage device.

Figure 8:
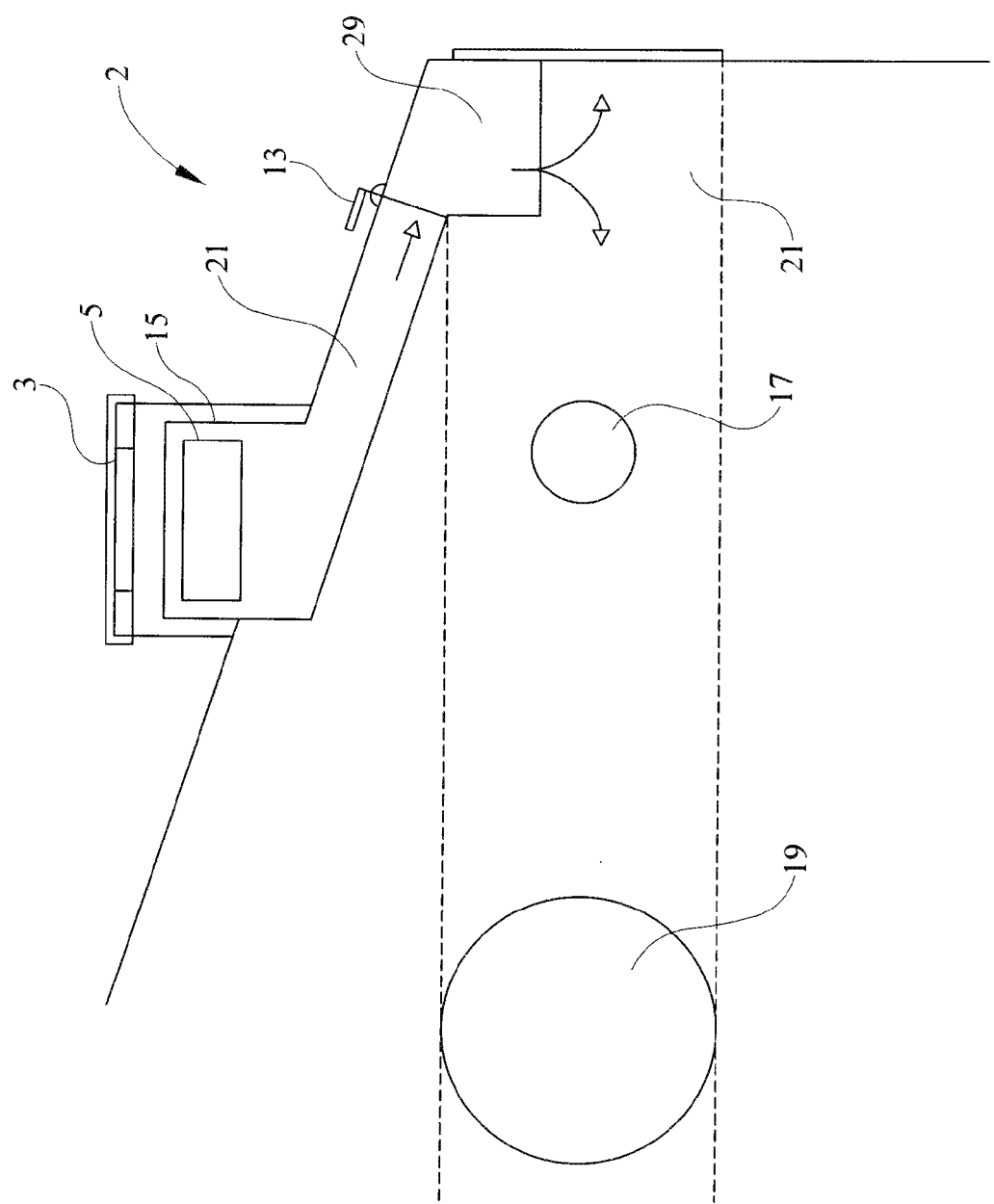
FIG. 8 shows a cross-sectional view of a portion of the body of a proppant storage device according to at least one embodiment of the application.
Figure 9:
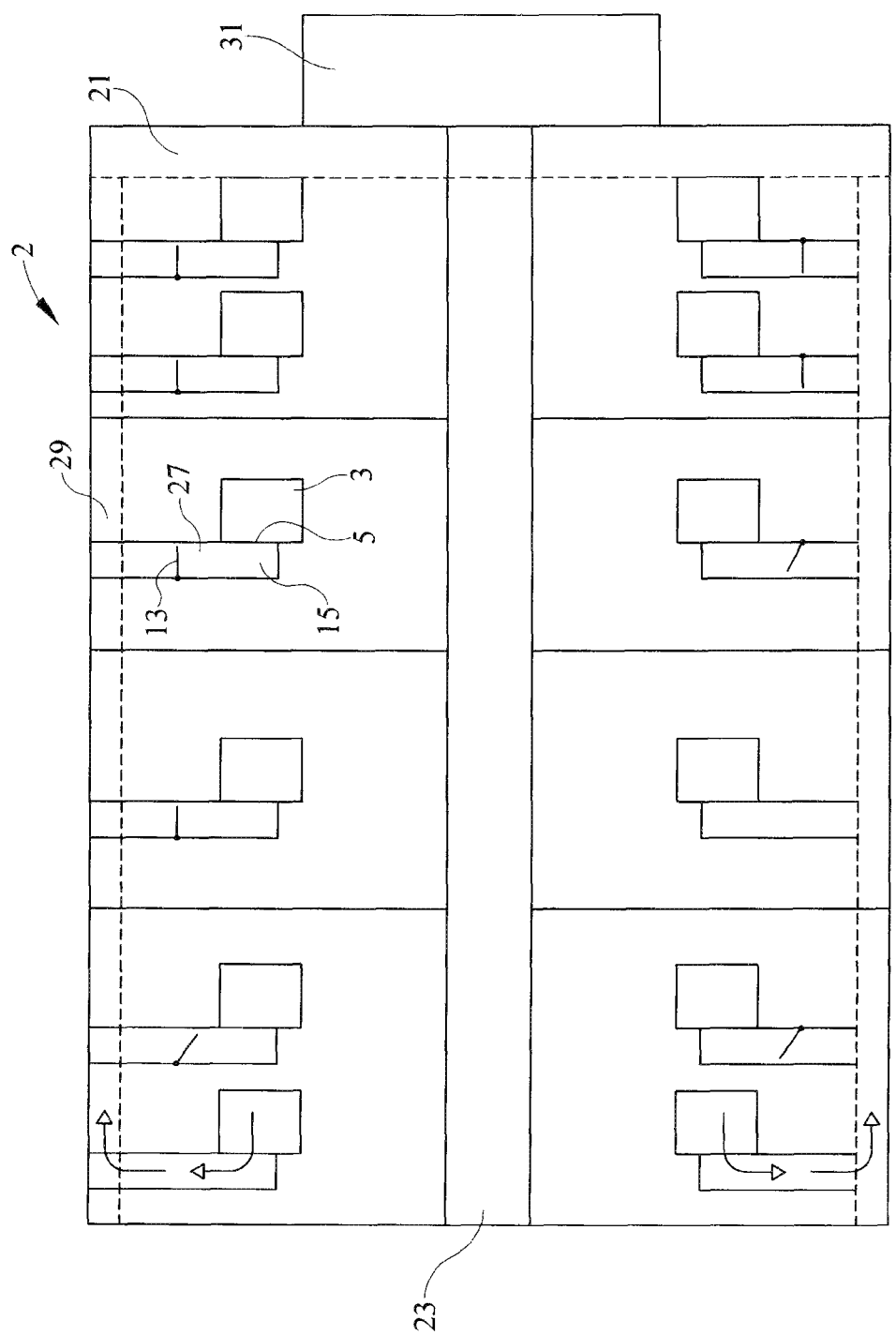
FIG. 9 shows a top view of a portion of the body of the proppant storage device according to FIG. 8.

FIG. 8 shows a cross-sectional view of a portion of the body of a proppant storage device 2 according to at least one embodiment of the application. The embodiment shown in FIG. 8 differs from that shown in FIG. 6 in that side air ducts 27 proceed outwardly, rather than inwardly, toward outer air ducts 29, which run along the outer edges of the storage device 2 (as shown in FIG. 9). Valves 13 control the flow of air through the side air ducts 27. The outer air ducts 29 connect to an exhaust duct 21, which is similar to the exhaust duct 11. The exhaust duct 21 also has a small air intake 17 and a large air intake 19, which can be connected to a vacuum arrangement used to collect dust produced by the transport of proppant on a conveyor positioned transverse to the length of the storage device 2, which conveyor is also known as a T-belt. FIG. 9 also shows a walkway 23 which is located on the roof or top surface of the storage device 2.

Figure 10:
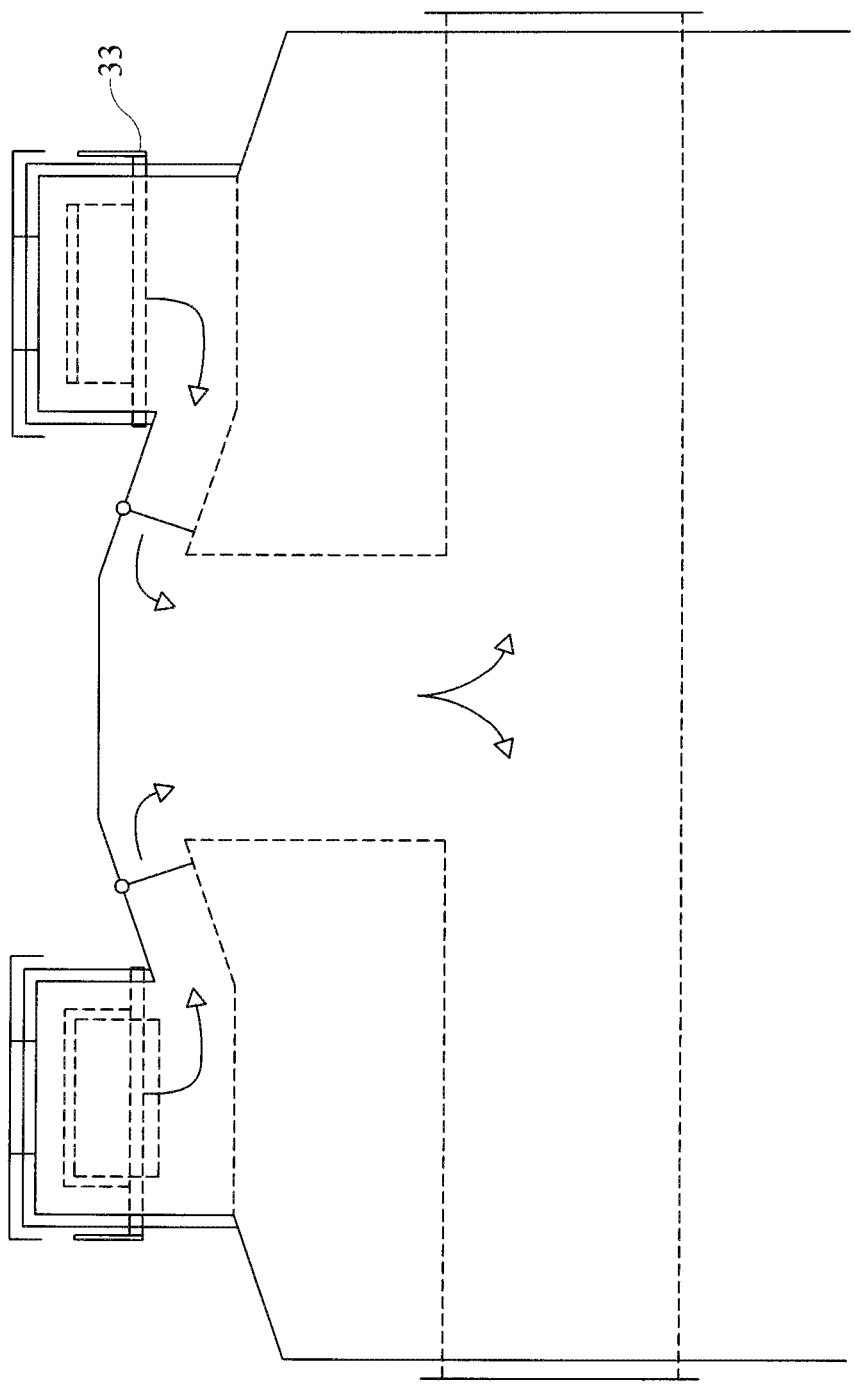
FIG. 10 shows a cross-sectional end view of a portion of the body of the proppant storage device according to FIG. 6 with additional features.
Figure 11:
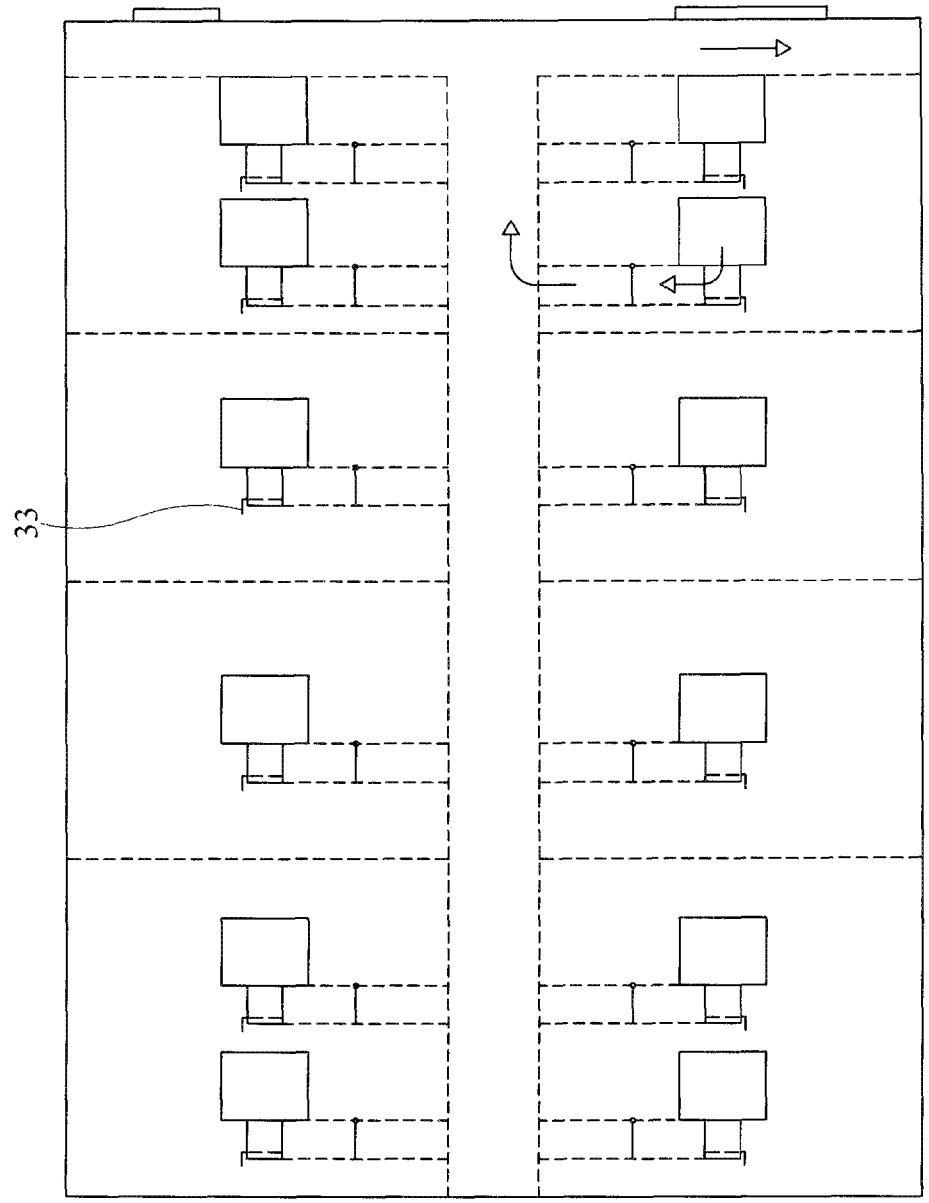
FIG. 11 shows a top view of a portion of the body of the proppant storage device according to FIG. 10.
Figure 12:
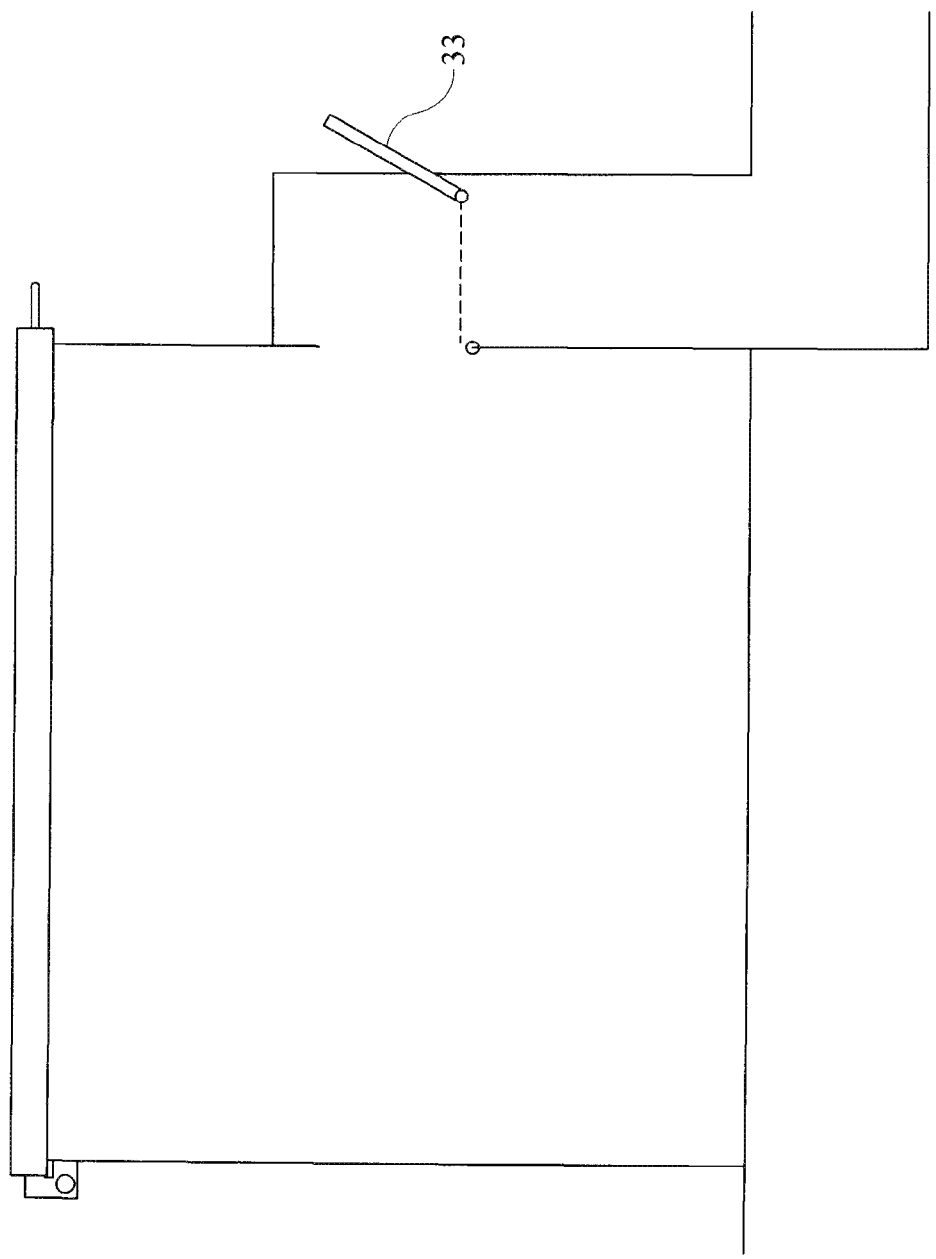
FIG. 12 shows a cross-sectional view of a portion of the proppant storage device according to FIG. 10.
Figure 13:
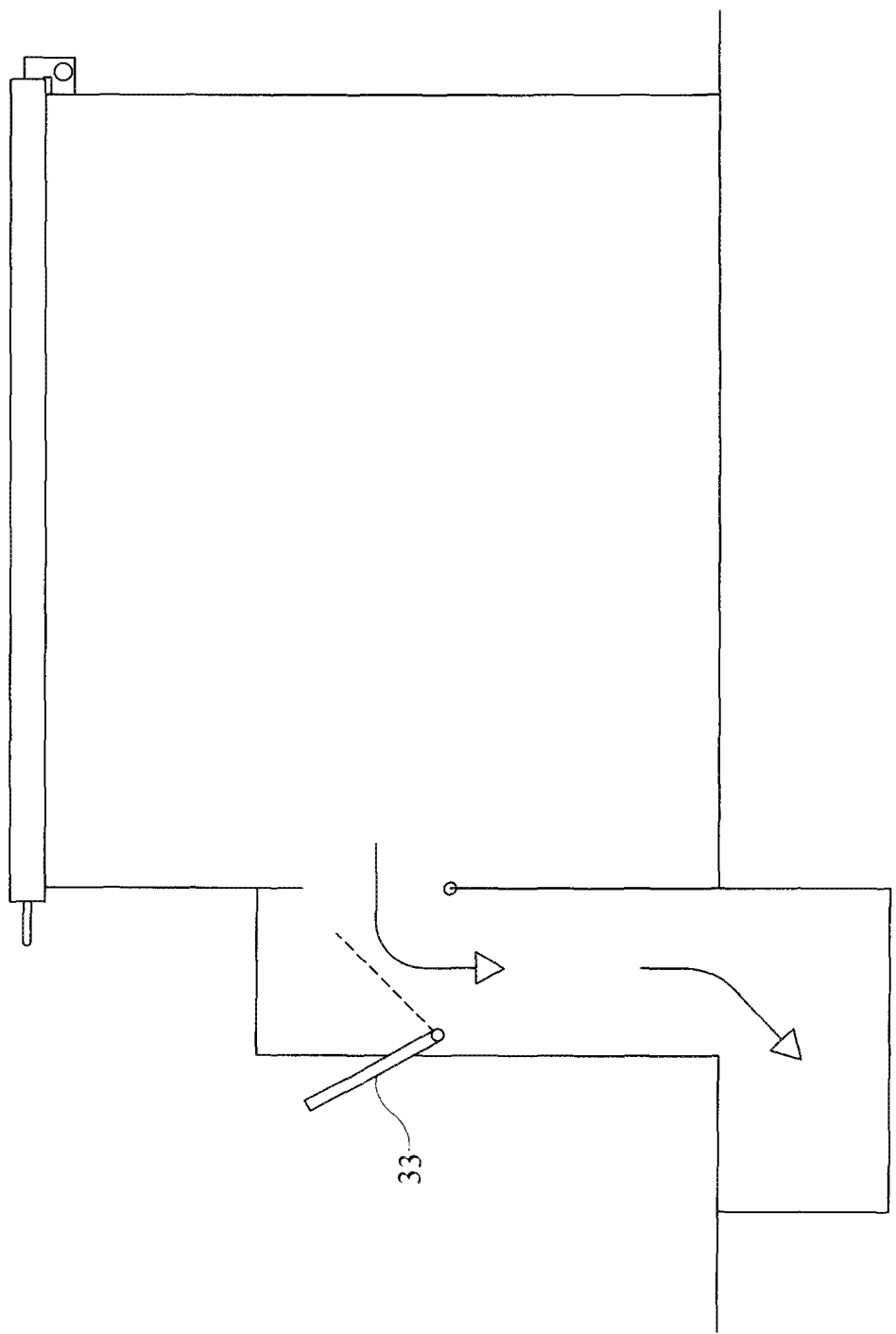
FIG. 13 shows another cross-sectional view of the portion of the proppant storage device according to FIG. 12.

FIG. 10 shows a cross-sectional end view of a portion of the body of the proppant storage device according to FIG. 6 with additional features, specifically valves 33, which can be used to allow or block airflow from the intake openings 5. FIG. 11 shows a top view of a portion of the body of the proppant storage device according to FIG. 10, with the valves 33 shown. FIGS. 12 and 13 show cross-sectional views of a portion of the proppant storage device according to FIG. 10, showing the valve 33.

Figure 14:
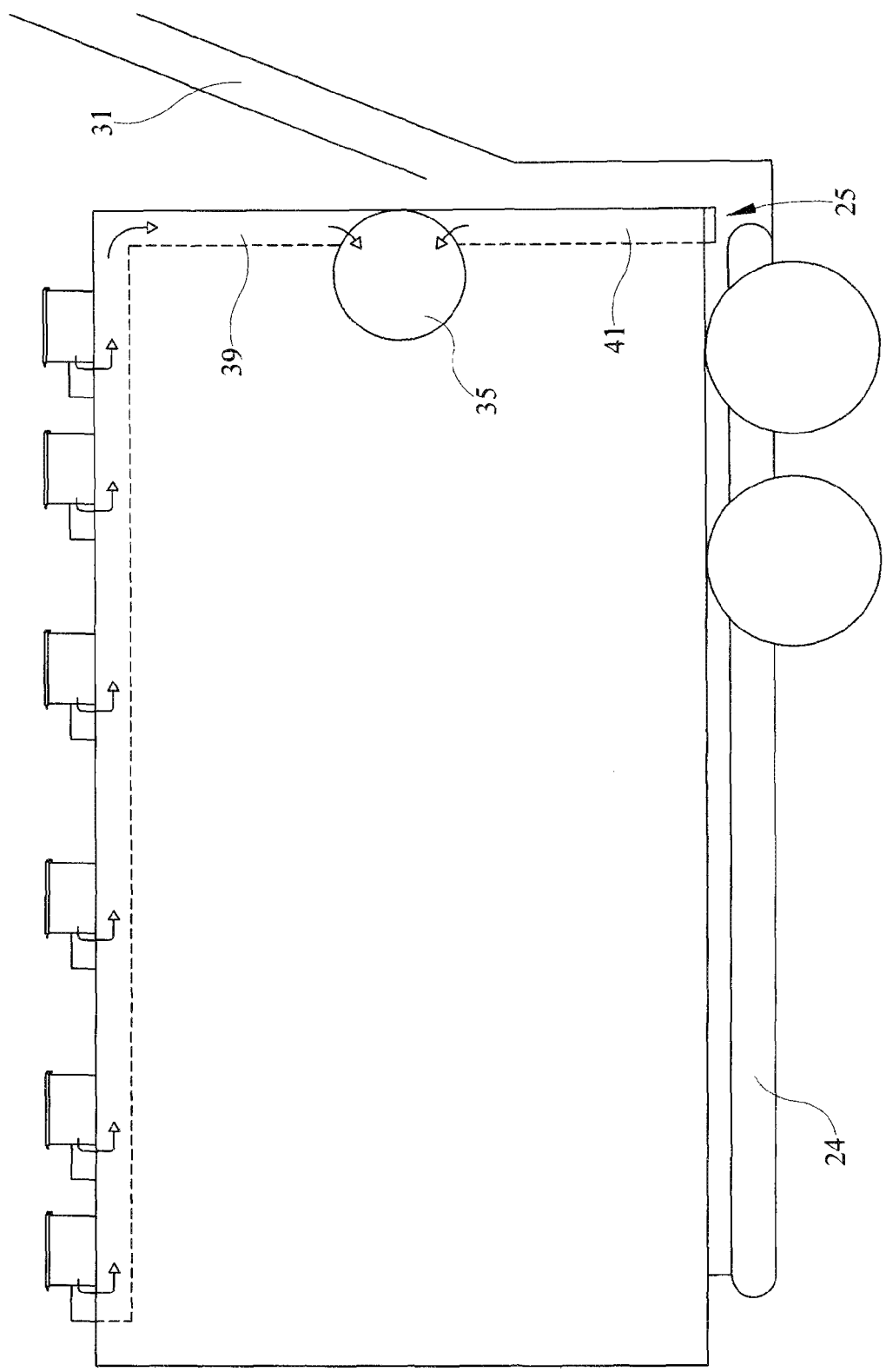
FIG. 14 shows a side view of the body of a proppant storage device according to at least one embodiment of the application.
Figure 16:
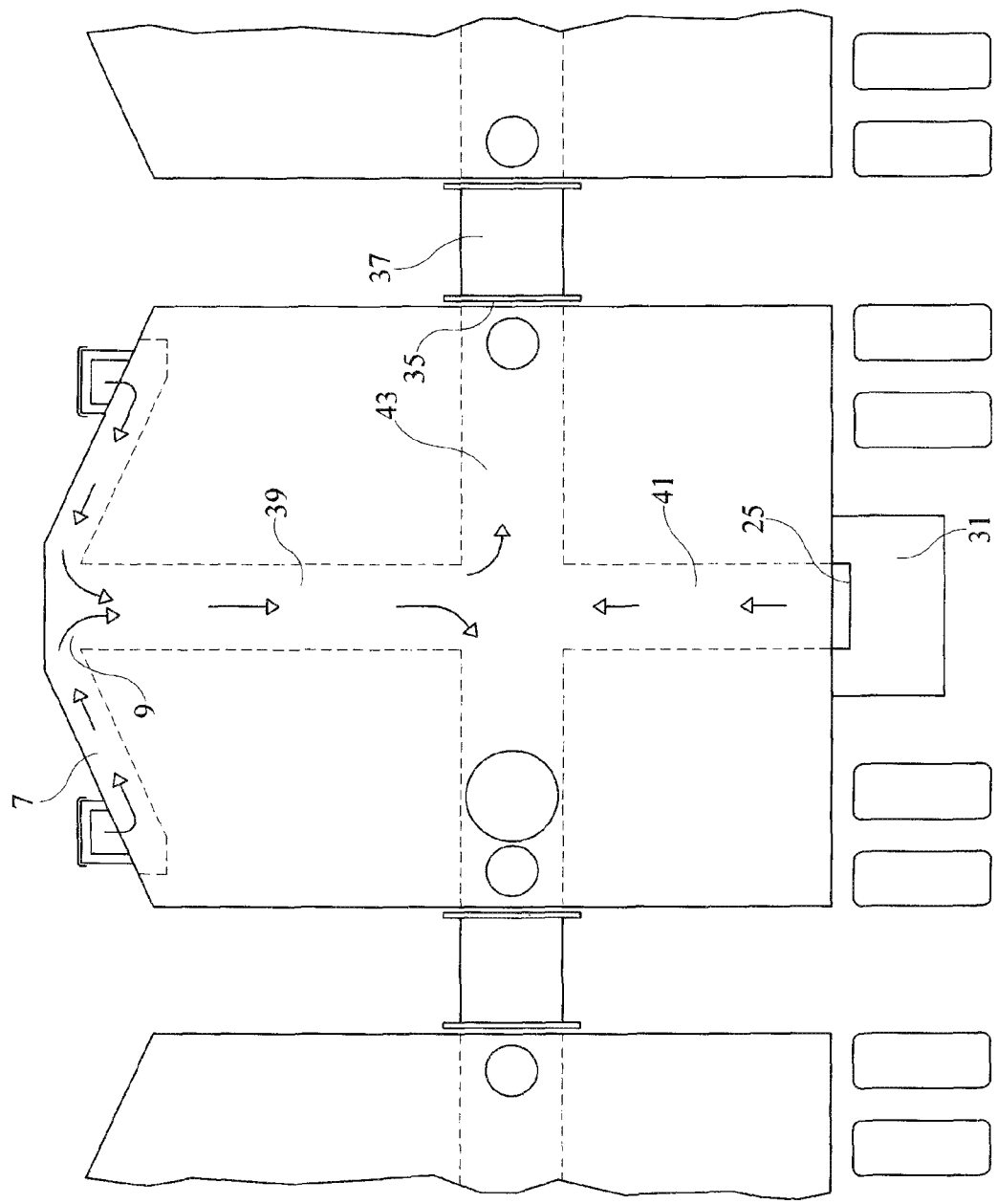
FIG. 16 shows a side view of the body of the proppant storage device according to FIG. 14 connected to additional proppant storage devices.

FIG. 14 shows a side view of the body of a proppant storage device according to at least one embodiment of the application. This embodiment is similar to the one shown in FIG. 6, but in this embodiment there is an upper connecting duct 39 which connects a central duct 9 to an exhaust duct 43. The exhaust duct 43 leads to exhaust ports 35 on the sides thereof. In addition, each of the storage devices has located on the underside thereof a conveyor 24. In operation, the proppant is released through openings in the underside of the storage device and onto the conveyor 24. The conveyor 24 transports the proppant to a second conveyor 31, which then deposits the proppant onto another conveyor, specifically a T-belt. The transport of the proppant on the conveyor 24 can disturb the proppant, especially at the point of transition from the conveyor 24 to the conveyor 31. A vacuum intake 25 is therefore located adjacent this transition point between the two conveyors 24, 31. The intake 25 is connected via a lower rear connecting duct 41 to the exhaust duct 43, as seen in FIG. 16. Also as seen in FIG. 16, the exhaust ducts 43 of multiple storage devices can be connected together to form a single exhaust which leads to the dust collecting device. Flexible sleeves 37 are used to connect the exhaust ducts 43.

Figure 15:
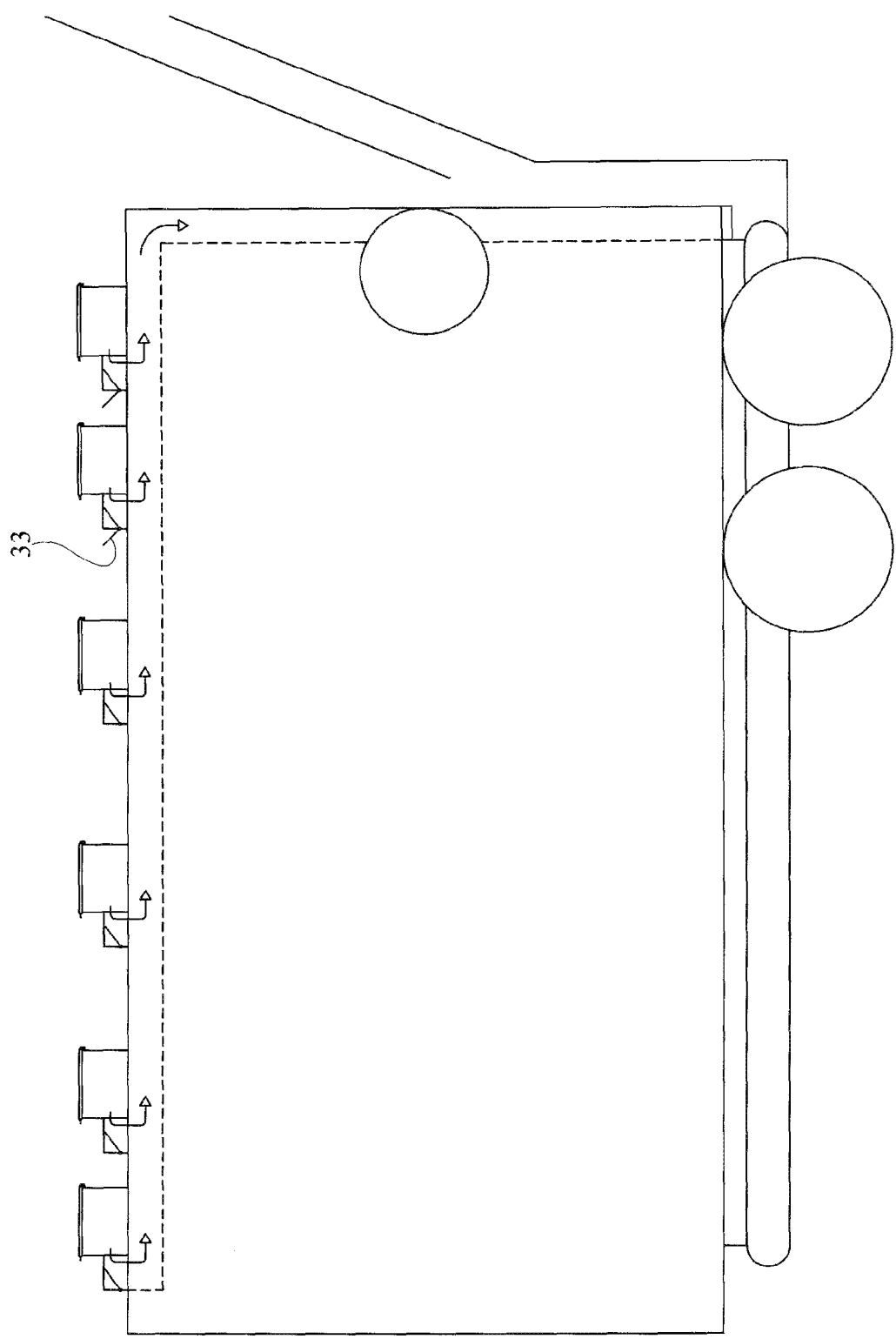
FIG. 15 shows a side view of a portion of the body of the proppant storage device according to FIG. 14 with additional features.

FIG. 15 shows a side view of a portion of the body of the proppant storage device according to FIG. 14 with additional features, specifically valves 33.

Figure 17:
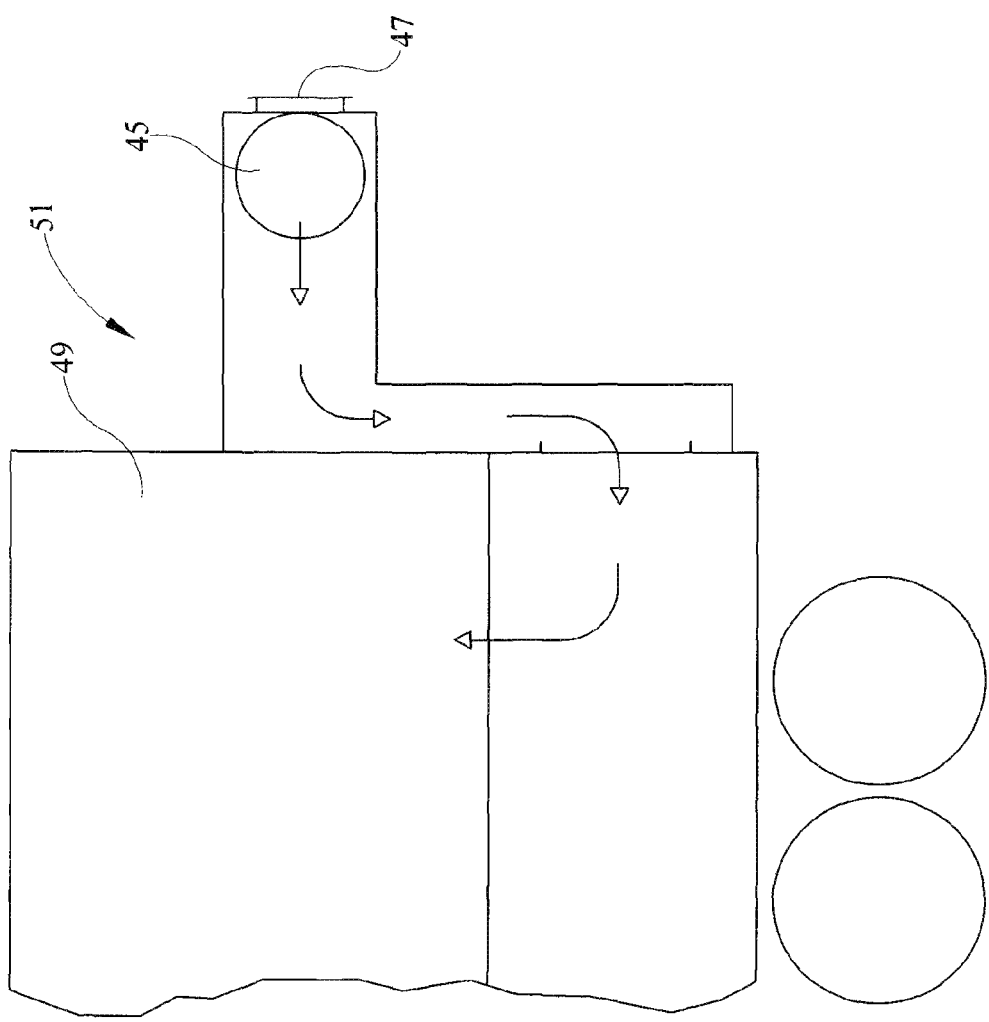
FIG. 17 shows a side view of a portion of a collection device according to at least one embodiment of the application.
Figure 18:
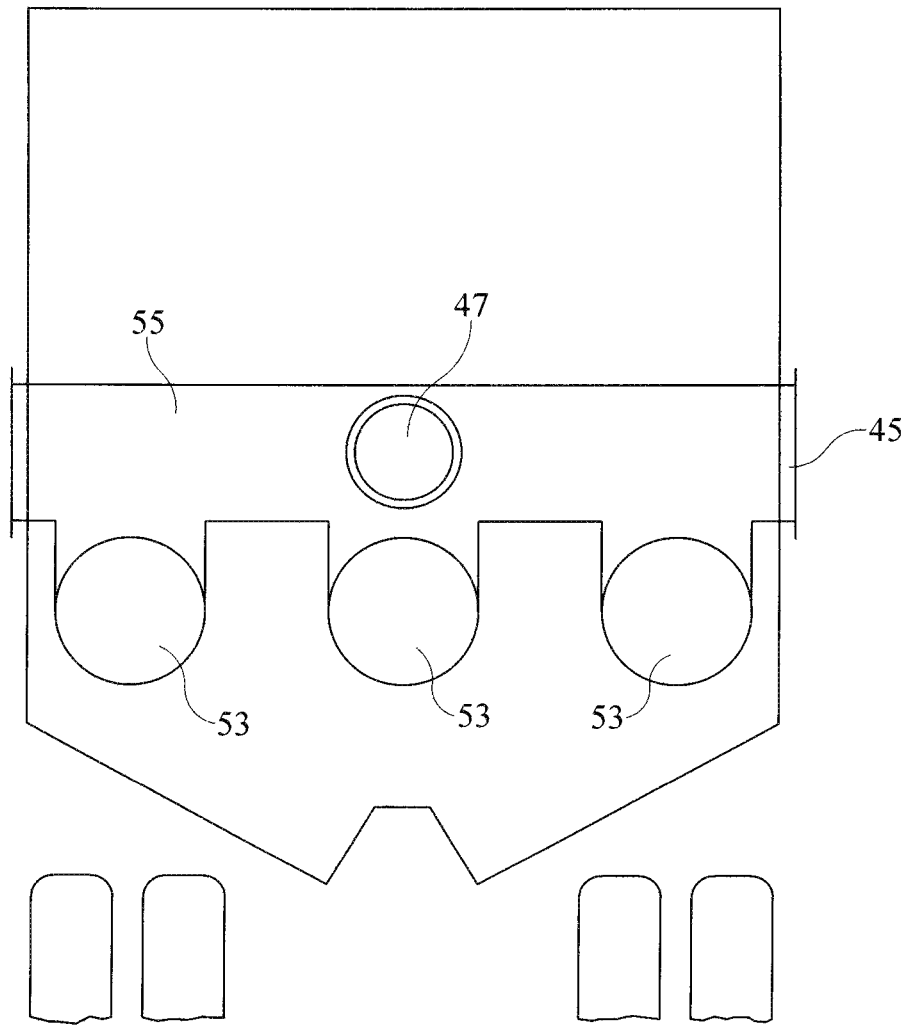
FIG. 18 shows a rear view of the collection device according to FIG. 17.

FIG. 17 shows a side view of a portion of a collection device 51 according to at least one embodiment of the application. The dust drawn into the vacuum system from the storage devices 1, 2 and/or the conveyor belts is ultimately collected in the collection device 51. An air intake 45 is connectable to tubes which connect to the storage devices 1, 2, and an air intake 47 is connectable to tubes which connect to air intakes for the T-belt. The collection device 51 houses air filter units 49. FIG. 18 shows a rear view of the collection device 51 according to FIG. 17. The air intake 45 is located at the end of a manifold 55, which is connected to ports 53 which lead into the interior of the collection device 51.

Figure 19:
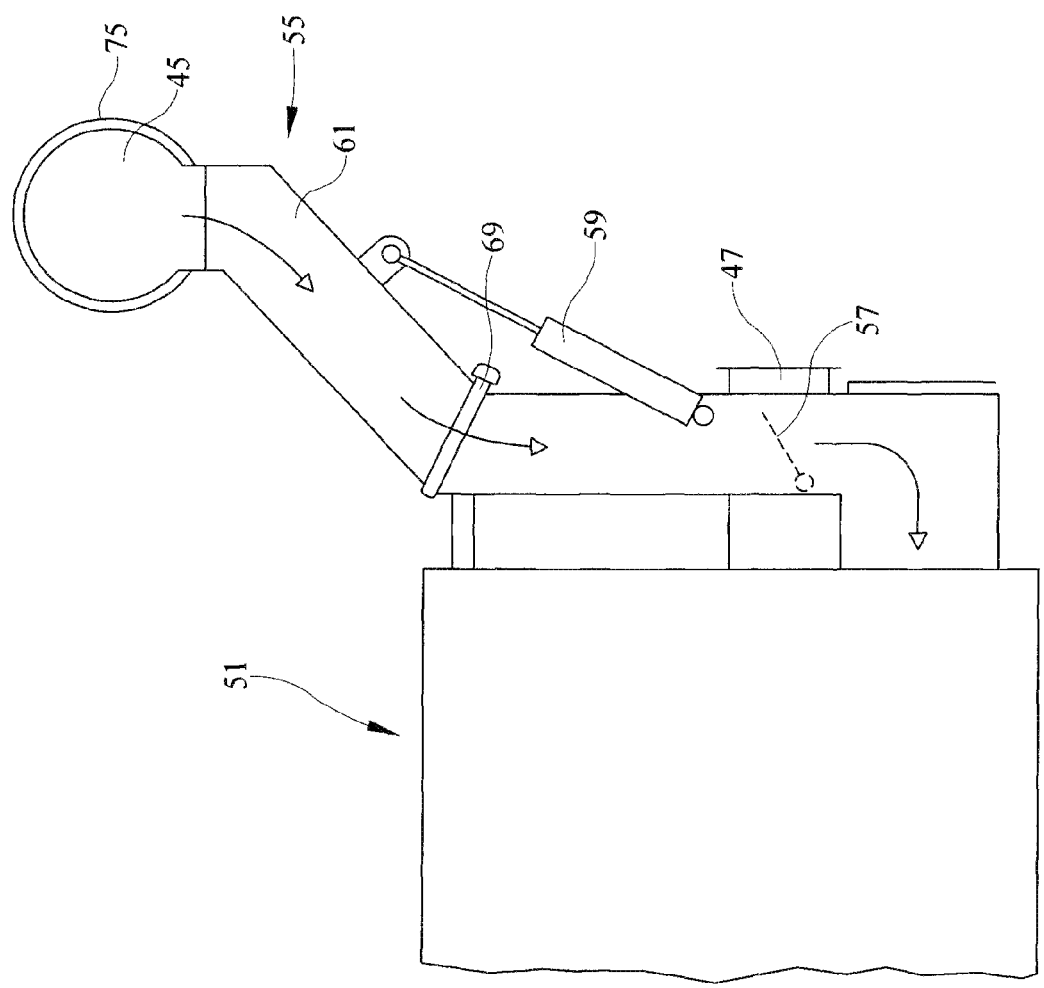
FIG. 19 shows a side view of a portion of a collection device according to at least one embodiment of the application.
Figure 20:
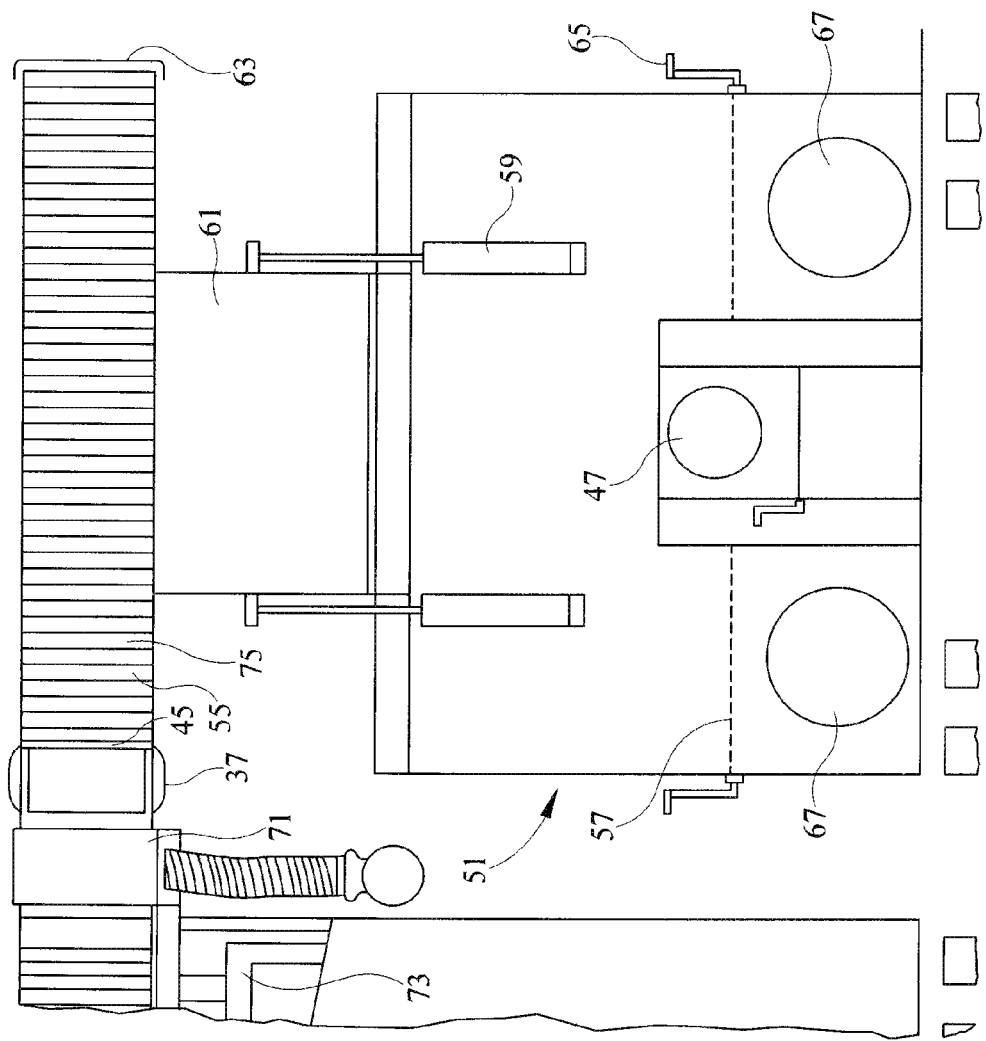
FIG. 20 shows a rear view of the collection device according to FIG. 19.

FIG. 19 shows a side view of a portion of a collection device 51 according to at least one embodiment of the application. The collection device 51 shown in FIG. 19 differs from that shown in FIG. 17 in that the manifold 55 is formed by a tube 75 and an articulated duct 61. The duct 61 is articulated at a hinge 69 and is movable by a hydraulic piston or arm 59. This moveability allows for the upper portion of the duct 61 to be retracted downwardly for storage during the movement of the dust collector 51, and then extended upwardly to be connected to the vacuum system upon installation at a hydraulic fracturing site. As shown in FIG. 20, a valve 57 can be opened or closed using a valve handle 65. The tube 75 can be connected using a flexible connecting sleeve 37 to a connector box 71, which is supported by a connector box table 73. In this manner the dust collector 51 can be connected to other tubing which leads to the air intakes which draw dust from the storage devices and the areas around the conveyor belts.

Figure 21:
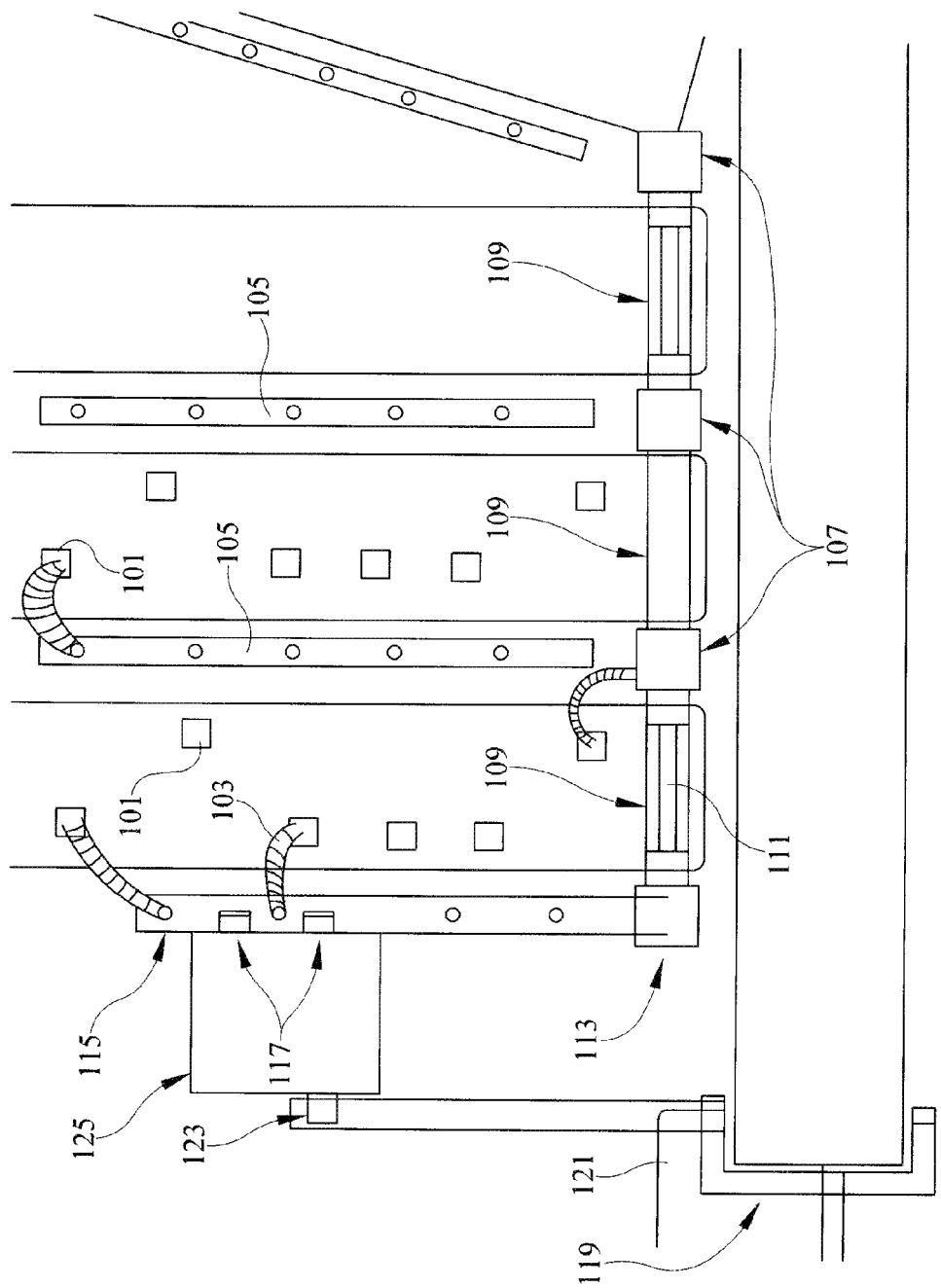
FIG. 21 shows a top view of an installed collection system according to at least one embodiment of the application.
Figure 21A:
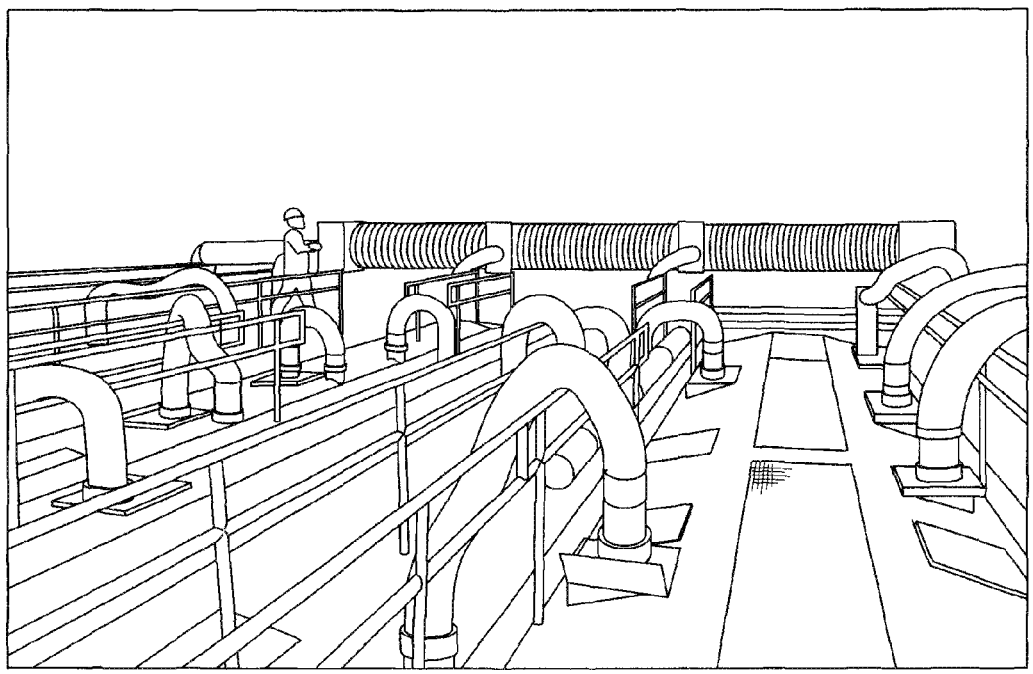
FIG. 21A shows another top view of an installed collection system according to at least one embodiment of the application.
Figure 22:
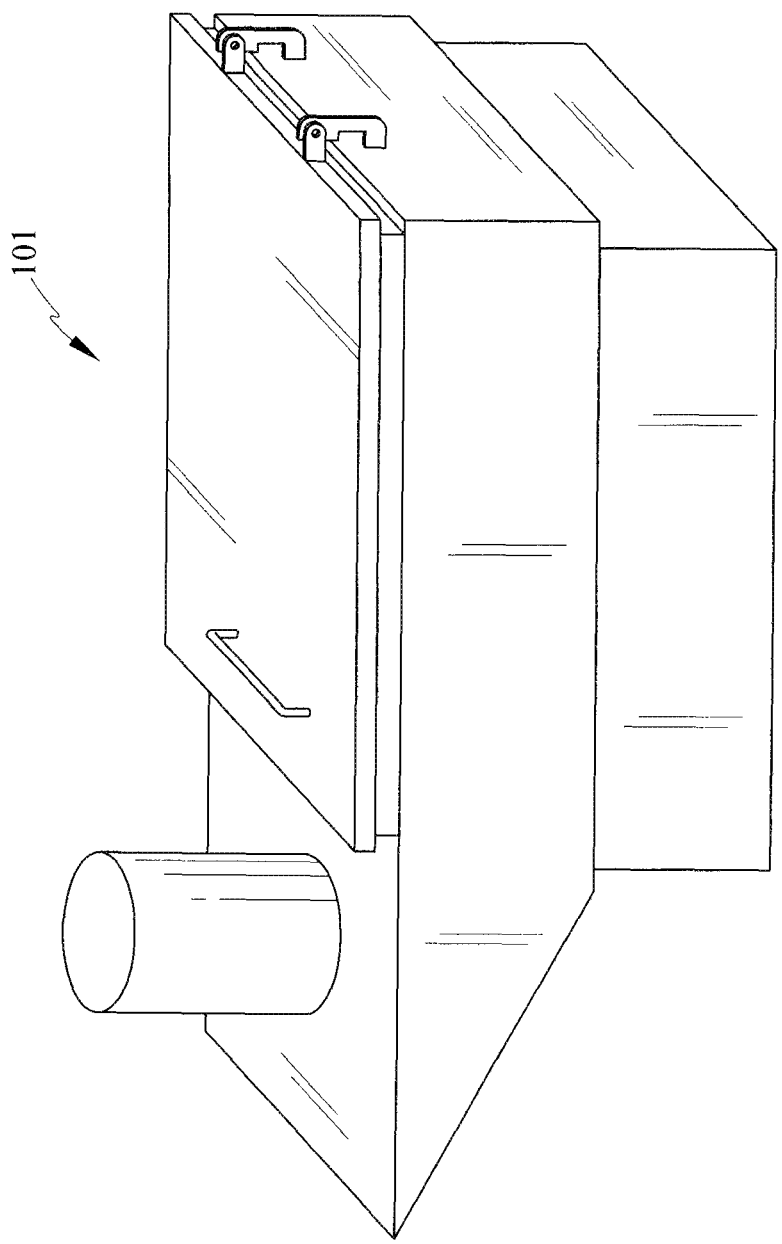
FIG. 22 shows a door arrangement of FIG. 21.

FIG. 21 shows a top view of an installed collection system according to at least one embodiment of the application. The collection system is connected to a series of proppant storage trailers once they have been positioned at the well site. The collection system has adaptable or portable doors or door arrangements 101 (see FIG. 22) that are designed to be placed over existing door openings in the storage trailers. The door arrangements 101 are such that an operator can open the door and look inside the storage trailer to determine the amount of product in the storage trailer and the amount being taken out of the storage trailer, while at the same time not interfere with the operation of the collection system. Each storage trailer requires different numbers of door arrangements 101 depending on sand storage manufacturers.

The proppant dust is removed via flex tubing 103, which can be connected to one or more door arrangements 101 as necessary.

Figure 23:
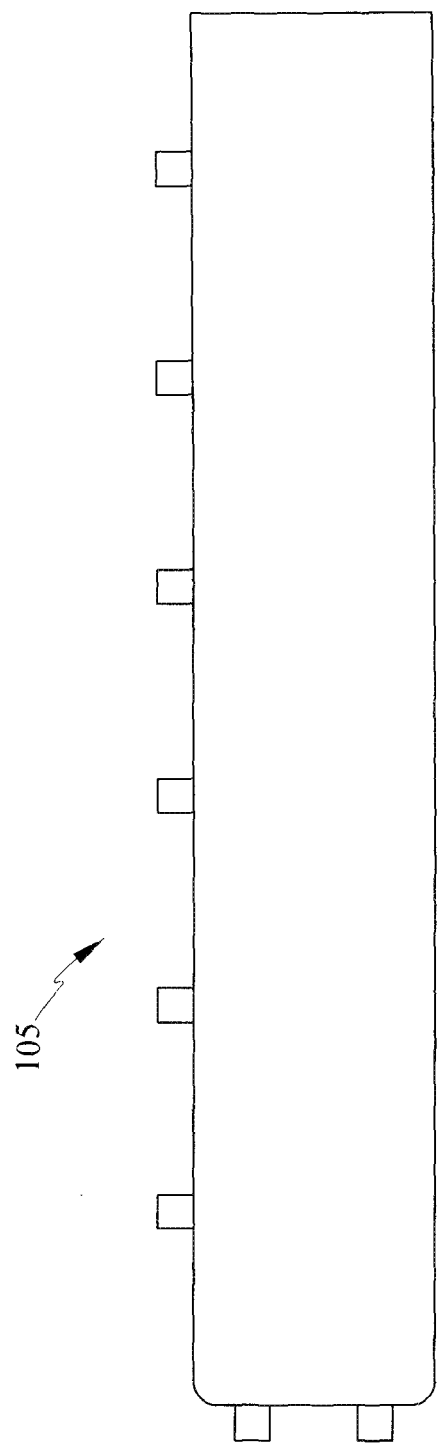
FIG. 23 shows a manifold arrangement of FIG. 21.
Figure 24:
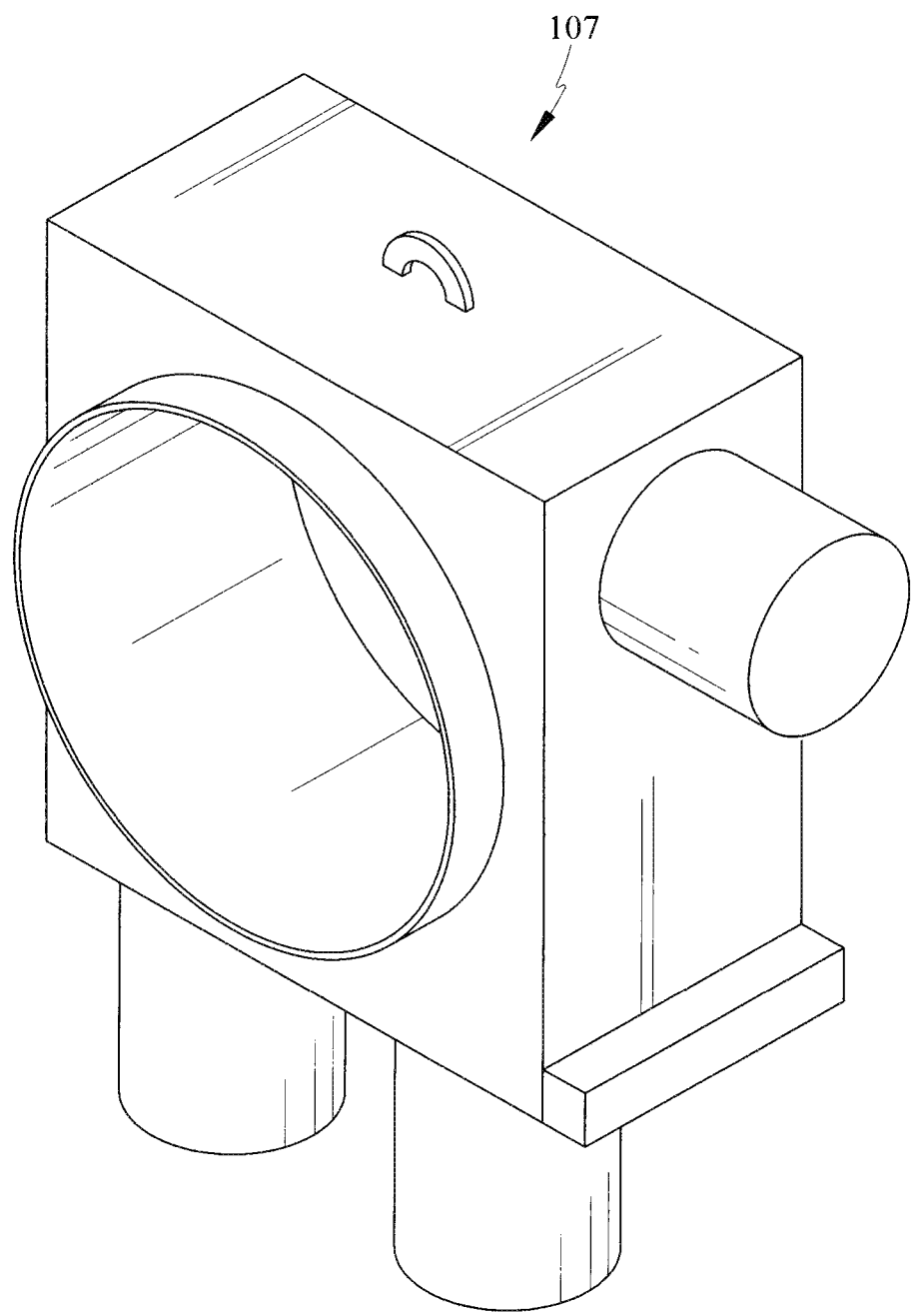
FIG. 24 shows a connector arrangement of FIG. 21.
Figure 25:
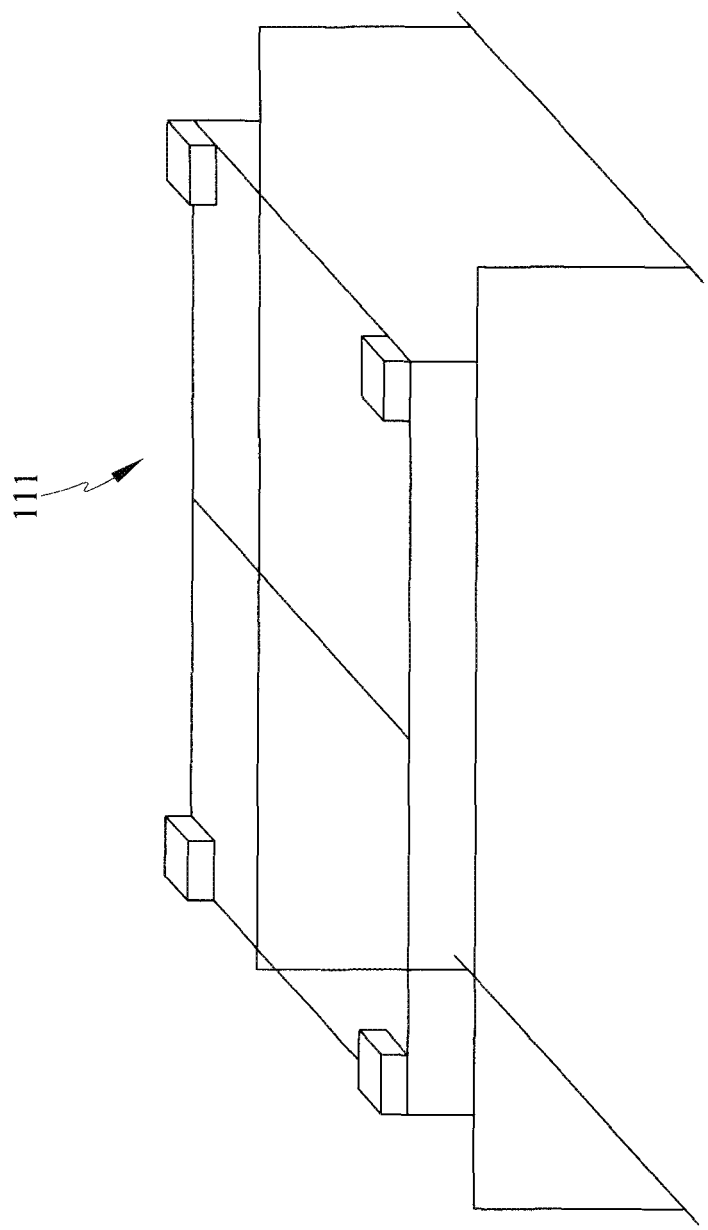
FIG. 25 shows a support arrangement of FIG. 21.

The dust is then carried to manifold arrangements 105 (see FIG. 23). The manifold arrangements 105 are designed to be placed between and suspended from the storage trailers once the storage trailers have been placed on site. The dust is then carried to connector arrangements 107 (FIG. 24). Each connector arrangement 107 is a flexible connector that allows for the variation in the placement of the sand storage trailers. The number of connector arrangements 107 used depends on the number of sand storage trailers being used at a well site. Table arrangements 111 (FIG. 25) suspend the connector arrangements between the sand storage trailers so they can be connected to the manifold arrangements 105 via a flexible hose connector.

Figure 26:
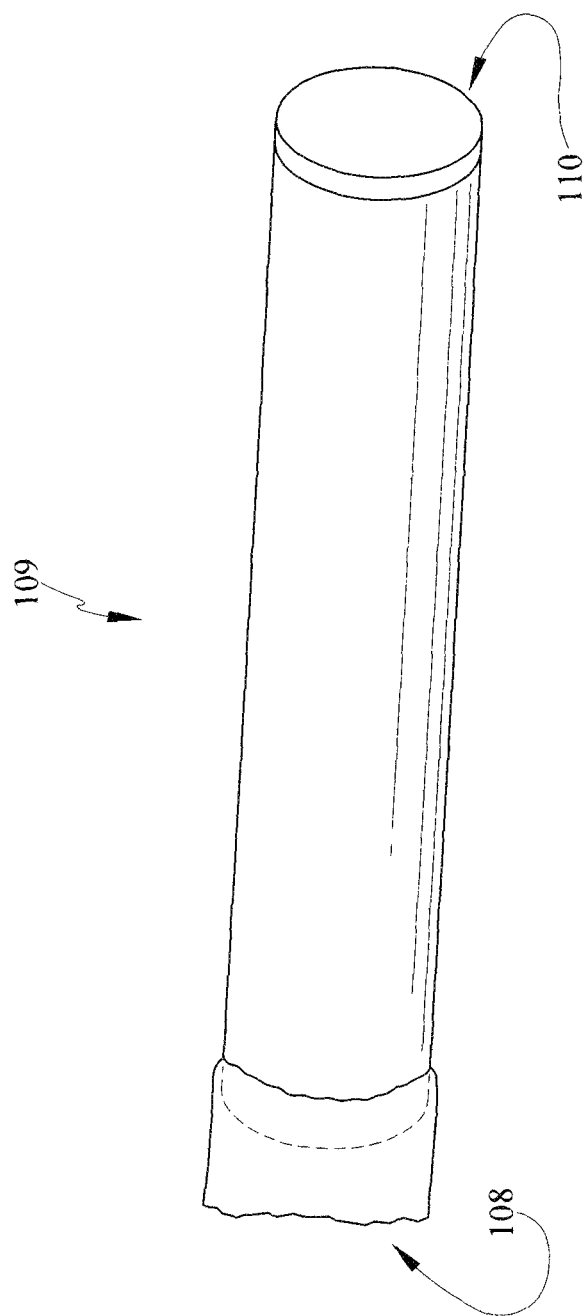
FIG. 26 shows a tube arrangement of FIG. 21.
Figure 27:
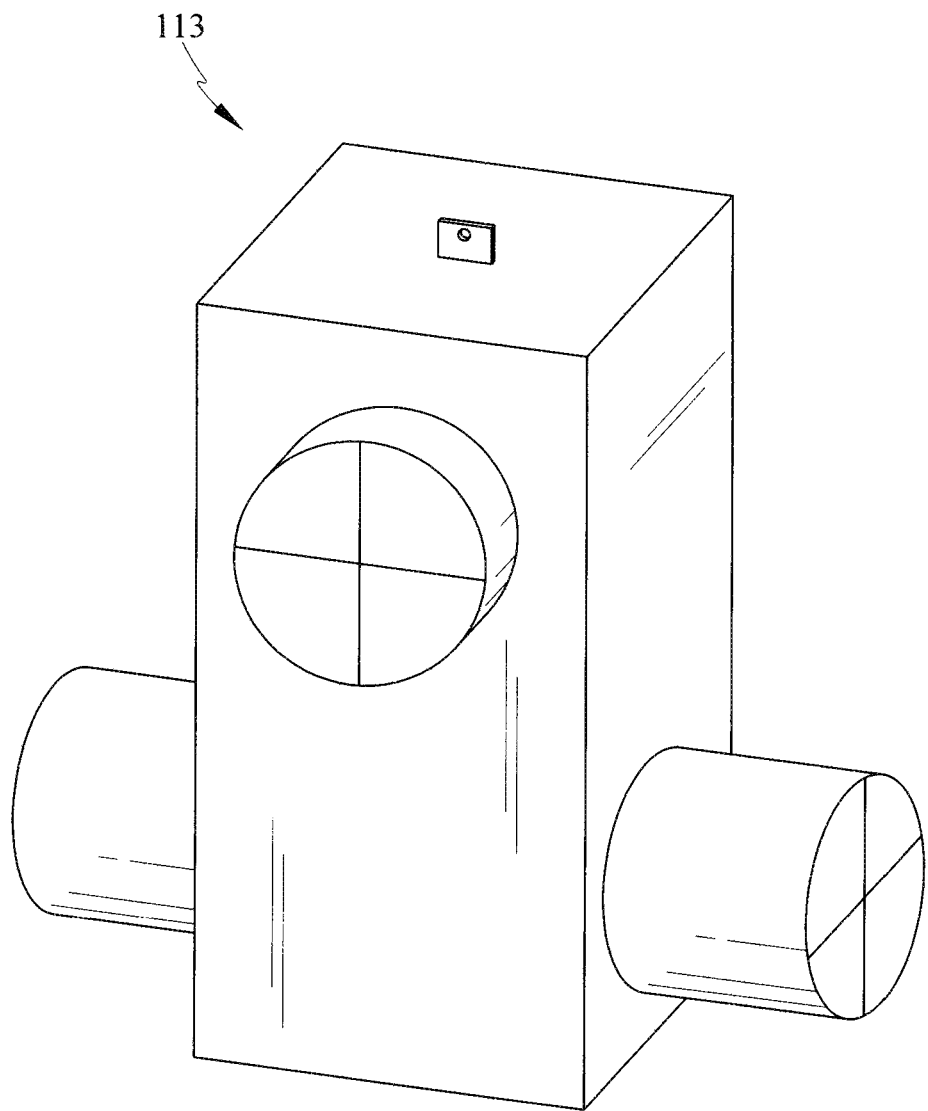
FIG. 27 shows a manifold arrangement of FIG. 21.

The dust is then carried to an adjustable, rigid sand/air handling tube arrangement 109 (FIG. 26). The purpose of the adjustable air handling tube arrangement 109 is to allow for the varying connection distances to the connector arrangements 107. The dust is then carried to the ninety-degree step manifold arrangement 113 (FIG. 27). The ninety-degree step manifold 113 allows for the making of turns with the air handling tubes and for the allowance of a right or left hand orientation.

Figure 28:
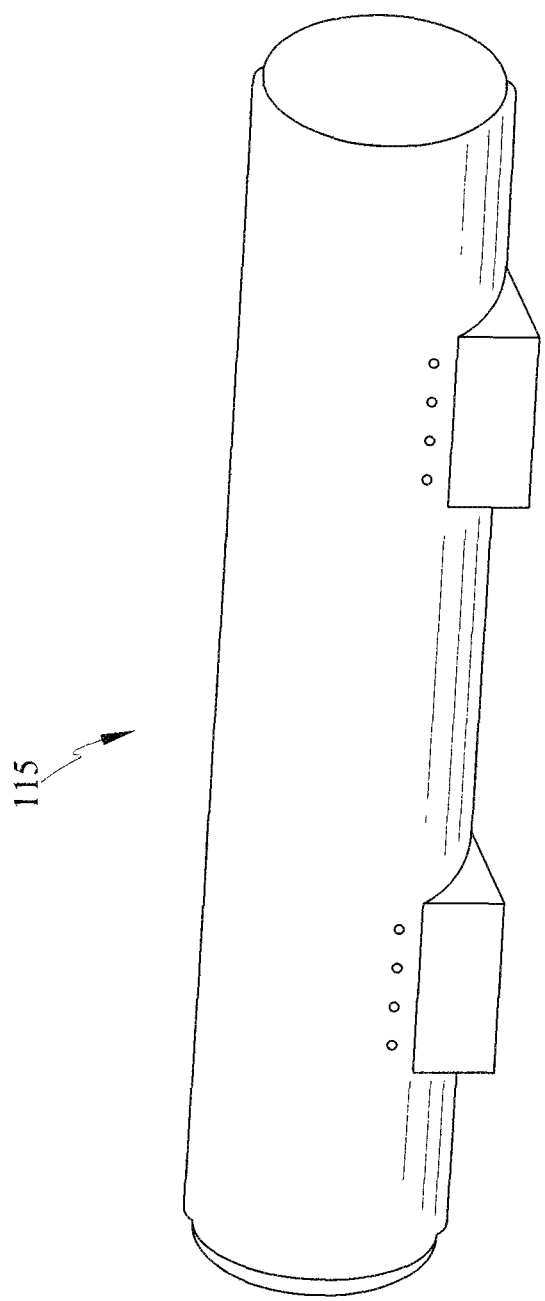
FIG. 28 shows a manifold arrangement of FIG. 21.
Figure 29:
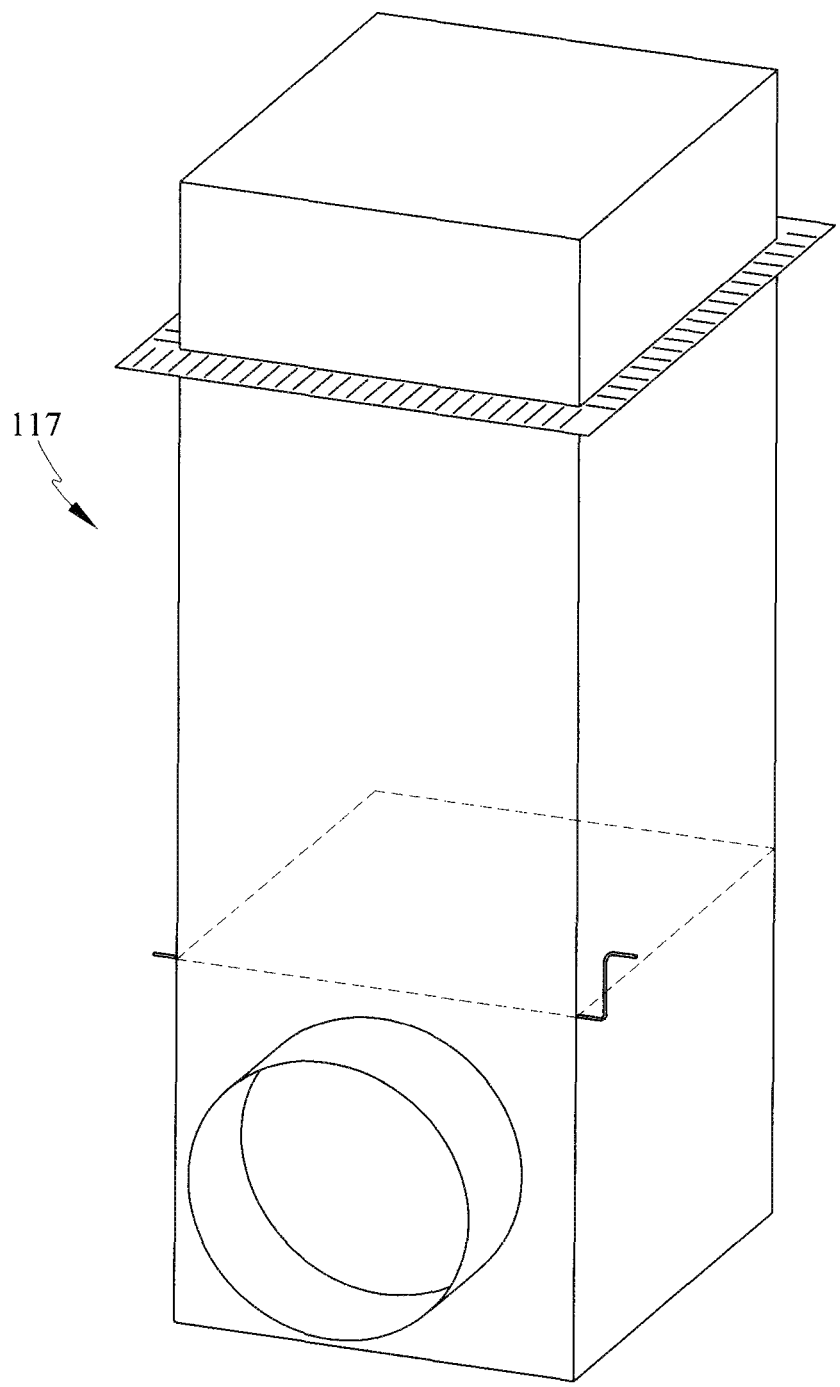
FIG. 29 shows a back view of a riser arrangement of FIG. 21.
Figure 30:
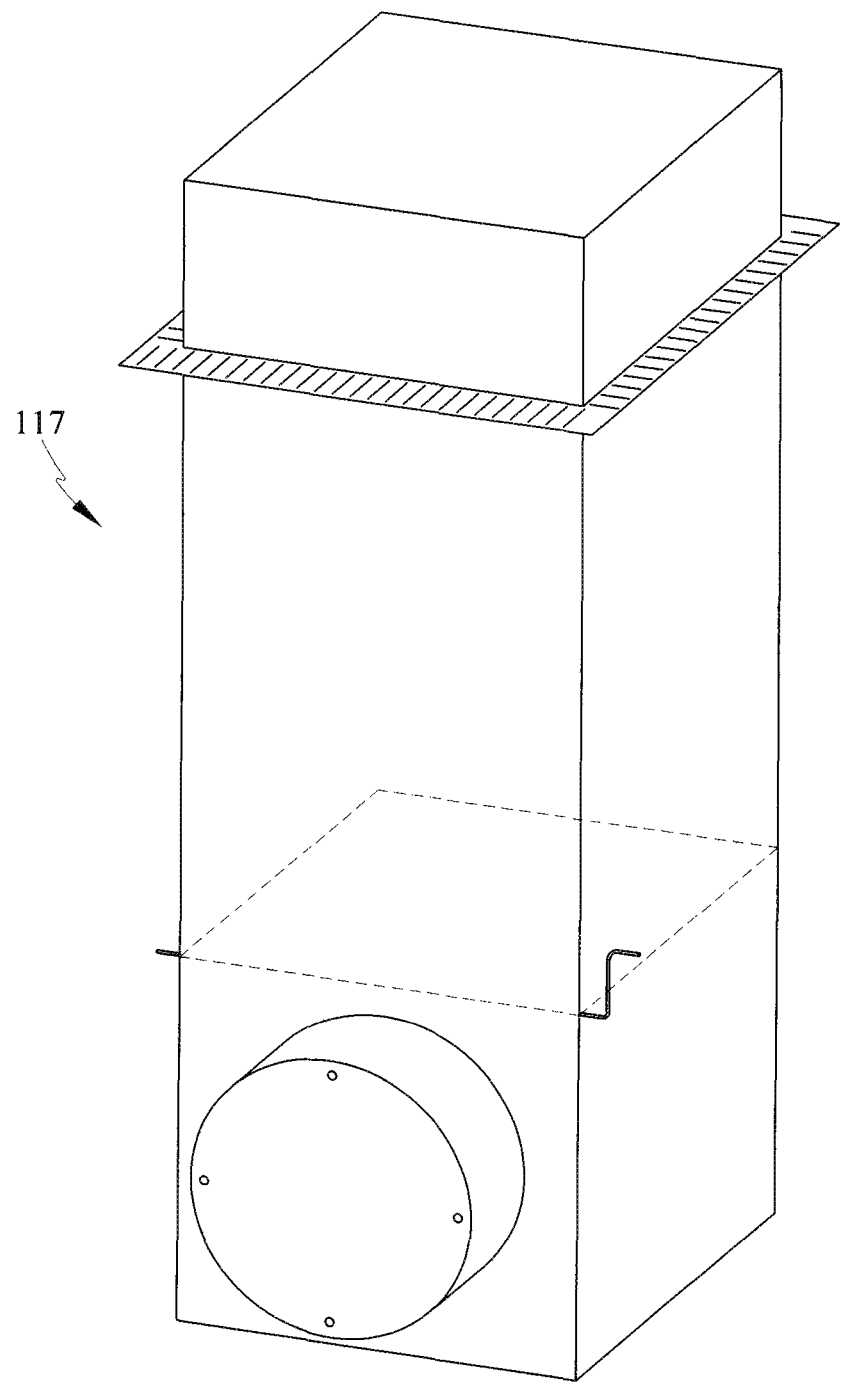
FIG. 30 shows a front view of a riser arrangement of FIG. 21.
Figure 34:
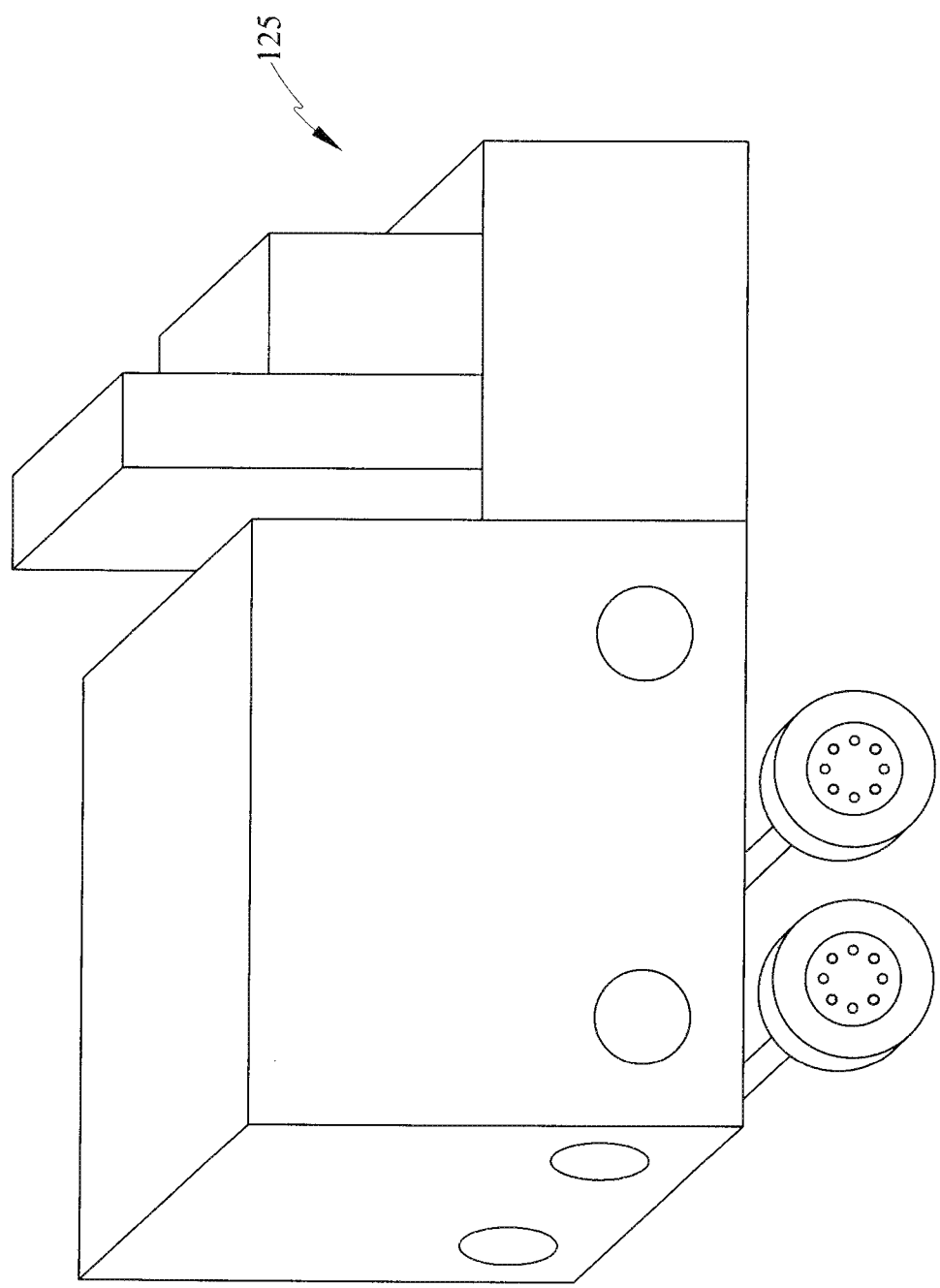
FIG. 34 shows a collector unit of FIG. 21.

The dust is then carried to the dual-riser manifold arrangement 115 (FIG. 28). The dual-riser manifold 115 is a tubing that has rectangular mating flanges that are attached to the tubing for the purpose of mating the round tubing to the two riser arrangements 117 (FIGS. 29 and 30). The dust is then carried to the dual riser arrangements 117, which are designed to take the vacuum from the vacuum source and elevate the air or vacuum to the desired height. The dual riser arrangements 117 also have open/close doors built into them with locking devices for control of airflow. The dust is then finally collected in a dust collector unit 125 (FIG. 34).

Figure 31:
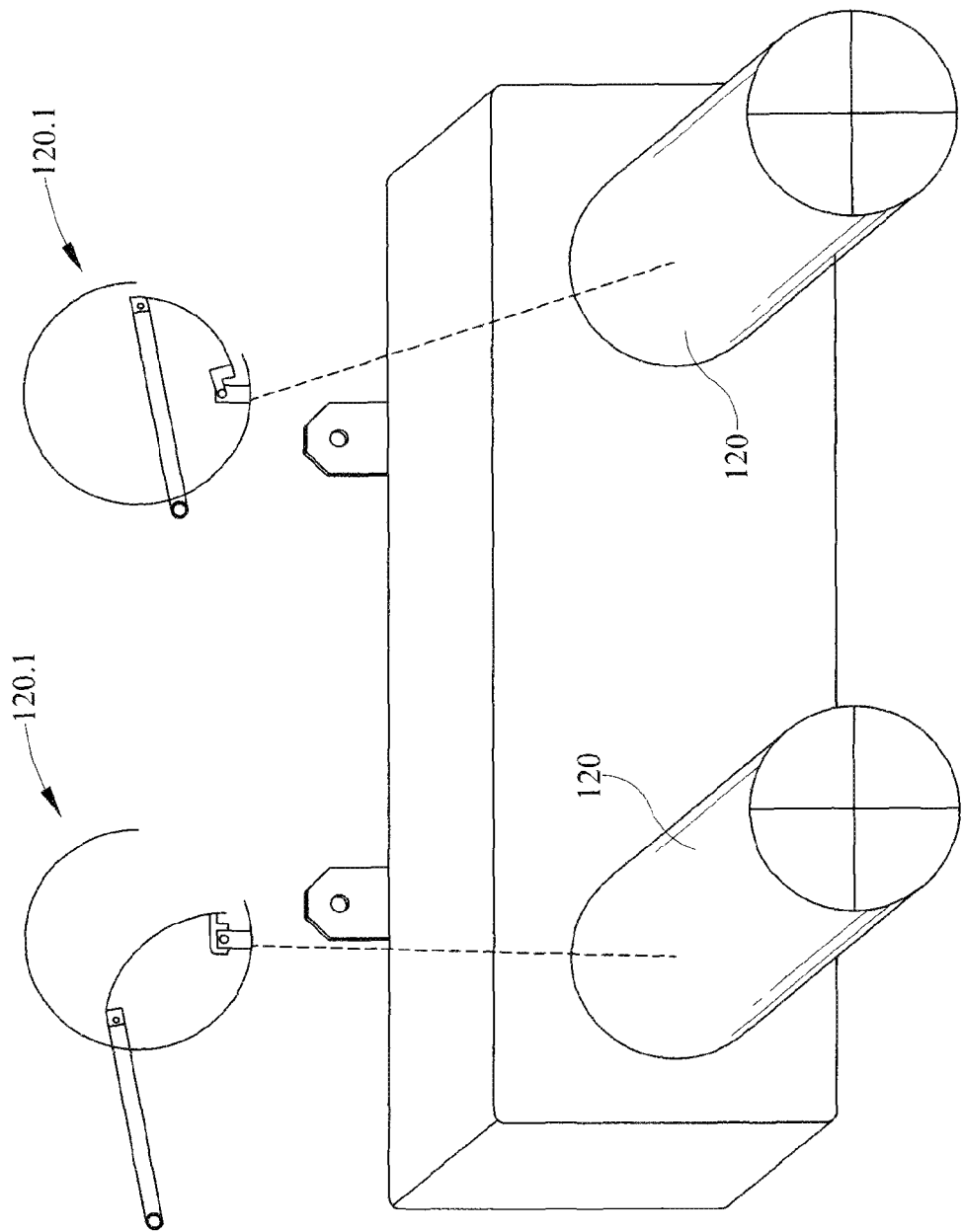
FIG. 31 shows a belt manifold arrangement of FIG. 21.
Figure 32:
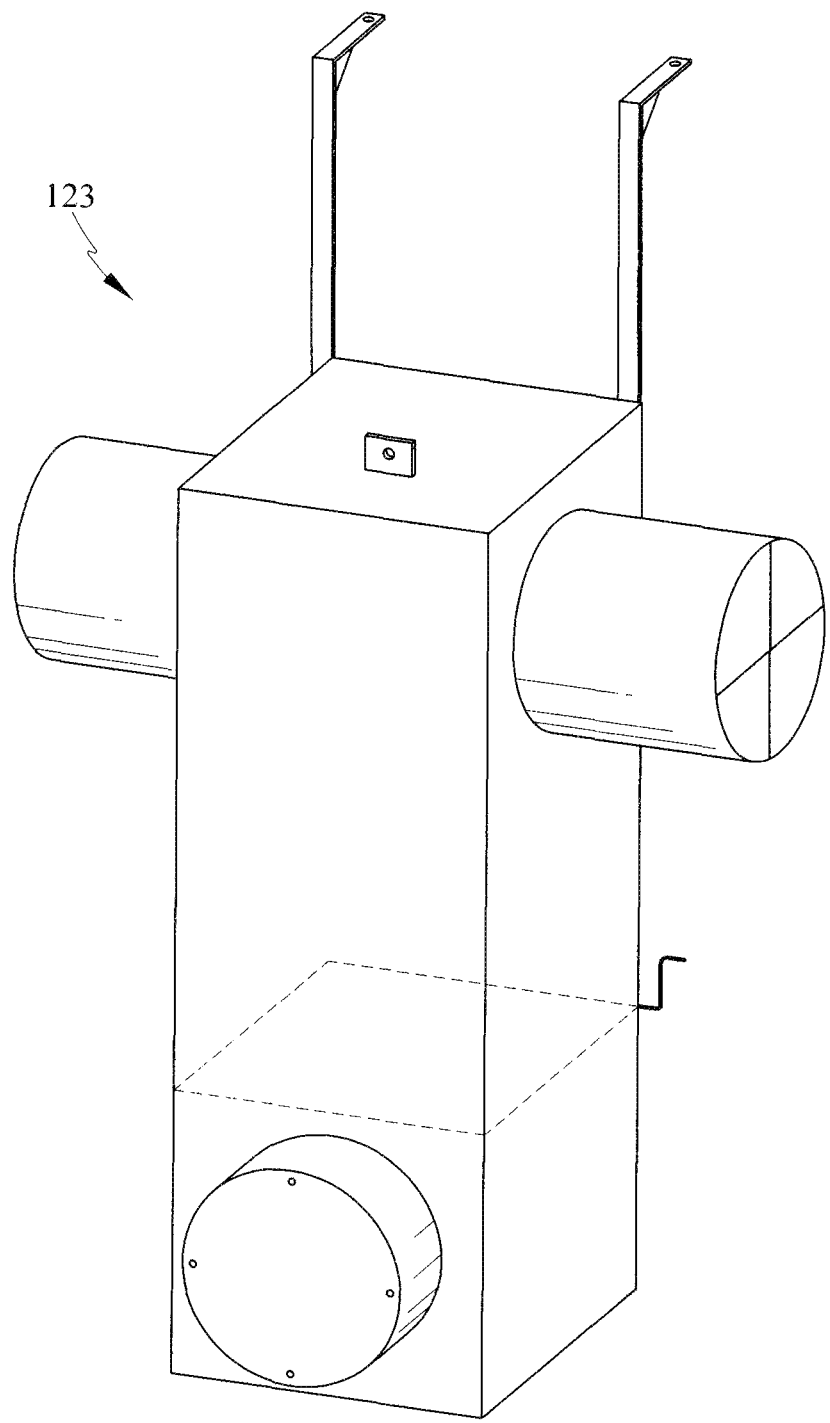
FIG. 32 shows a front view of a riser arrangement of FIG. 21.
Figure 33:
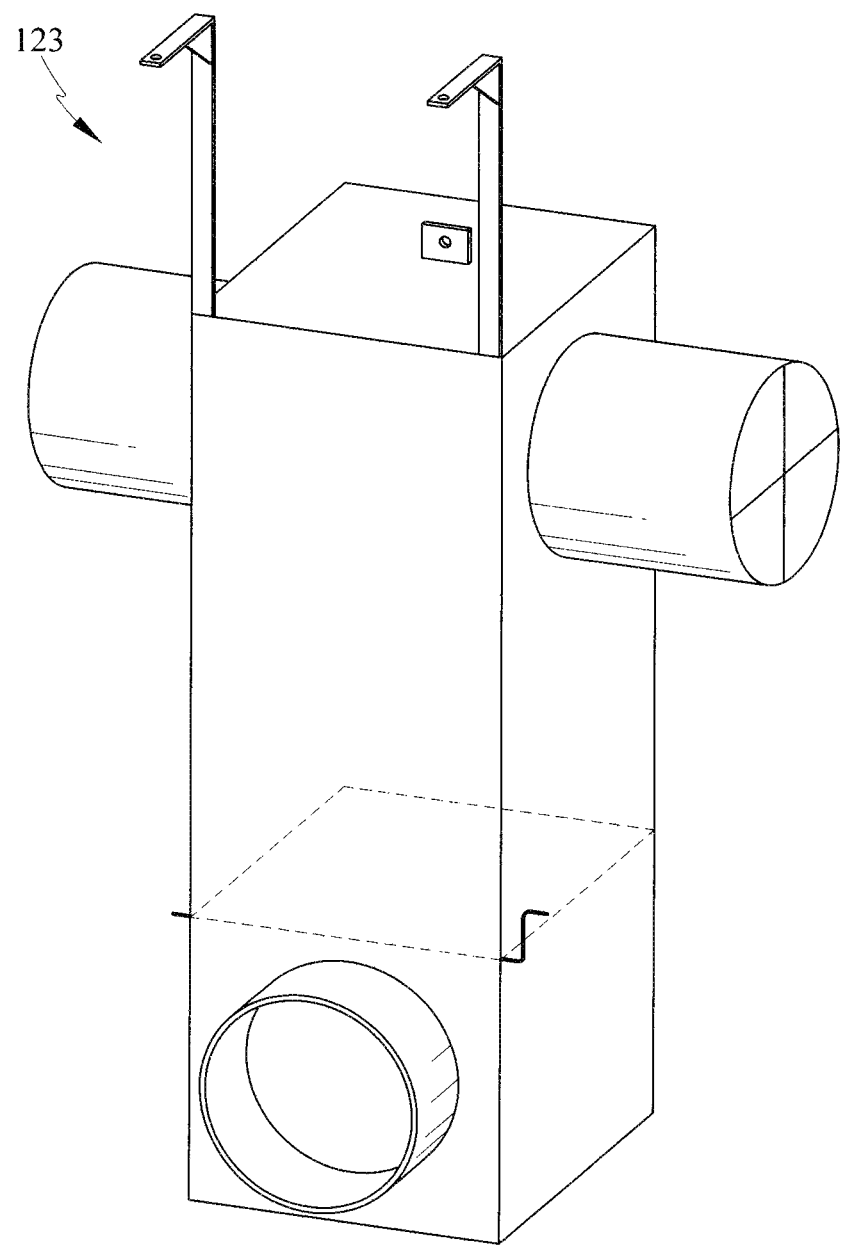
FIG. 33 shows a back view of a riser arrangement of FIG. 21.

Another part of the collecting arrangement is collecting dust at the discharge slides of the sand blender T-belt. This is done by the T-belt manifold arrangement 119 (FIG. 31). The T-belt manifold arrangement 119 pulls the dust at the discharge openings of the T-belt and can be used in a right or left hand orientation. This manifold arrangement 119 is designed to be used on one of two blending units by the manipulation of built-in open/close door assemblies 120.1 located in each of tubes 120. The dust is then taken from the T-belt manifold arrangement 119 by tubing to the blender feed belt riser arrangement 123 (FIGS. 32 and 33), which takes vacuum from the source and elevates the air to the desired elevation. This arrangement is designed to be used in either a left or right hand configuration. The blender feed belt riser arrangement 123 has an open/close door built into it. The dust from the blender area is also finally collected in the collector unit 125.

Figure 35:
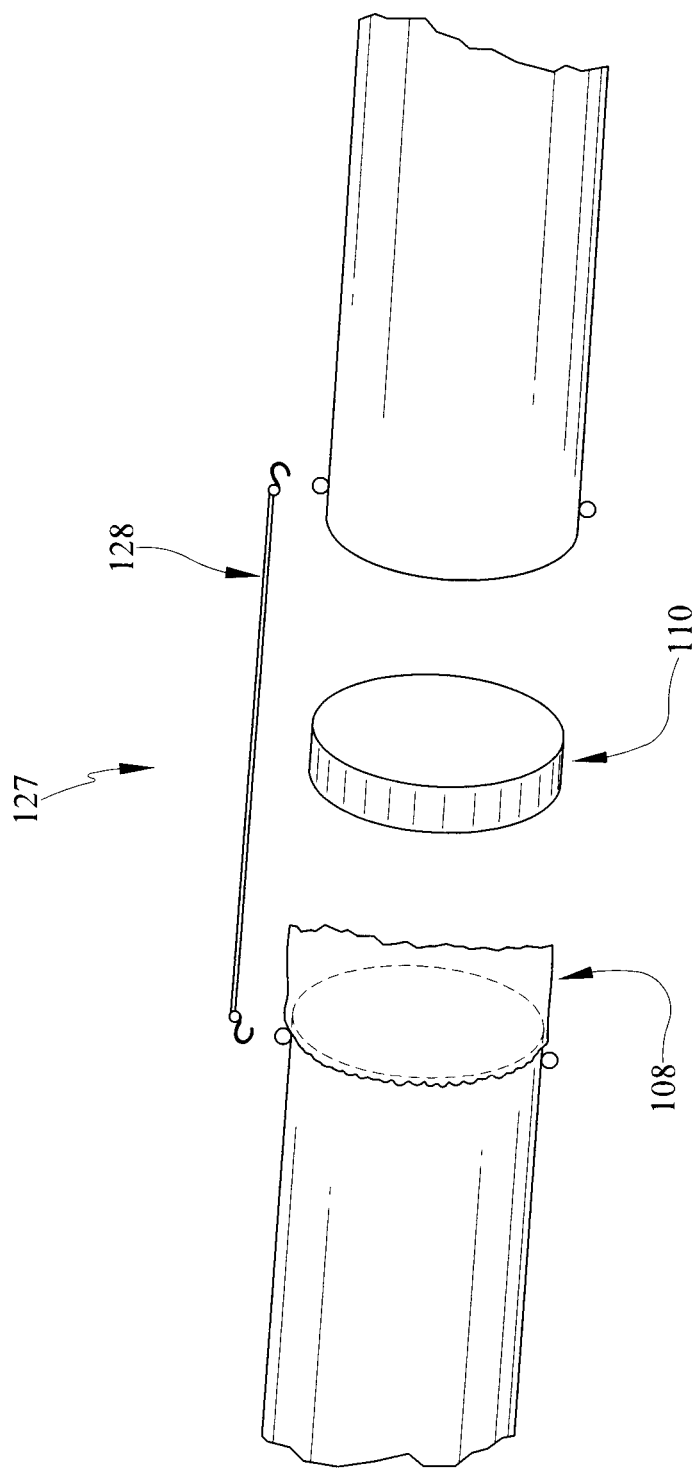
FIG. 35 shows a tube connector according to at least one embodiment of the application.

FIG. 35 shows a tube connector 127 according to at least one embodiment of the application. The tube connector 127 is used for connecting large diameter pipe in vacuum applications. The pipes are connected with a steel, plastic, or aluminum alignment insert 110. The connection is then sealed with an elastic water tight sock 108, and finally pulled together with an elastic strap 128.

U.S. patent application Ser. No. 14/209,478, filed on Mar. 13, 2014, U.S. patent application Ser. No. 13/606,913, filed on Sep. 7, 2012, U.S. patent application Ser. No. 13/416,256, filed on Mar. 9, 2012, U.S. Provisional Patent Application 61/451,435, filed Mar. 10, 2011, U.S. Provisional Patent Application 61/590,233, filed Jan. 24, 2012, U.S. Provisional Patent Application 61/601,875, filed Feb. 22, 2012, and U.S. Provisional Patent Application No. 61/786,274, filed Mar. 14, 2013, are hereby incorporated by reference as if set forth in their entirety herein.

The components disclosed in the patents, patent applications, patent publications, and other documents disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications, patent publications, and other documents cited herein, and in the Declaration attached hereto, are hereby incorporated by reference as if set forth in their entirety herein except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, patent applications, patent publications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, patent applications, patent publications, and other documents either incorporated by reference or not incorporated by reference.

All of the references and documents cited in any of the patents, patent applications, patent publications, and other documents cited herein, except for the exceptions indicated herein, are hereby incorporated by reference as if set forth in their entirety herein except for the exceptions indicated herein. All of the patents, patent applications, patent publications, and other documents cited herein, referred to in the immediately preceding sentence, include all of the patents, patent applications, patent publications, and other documents cited anywhere in the present application.

The purpose of incorporating patents, patent applications, patent publications, and other documents is solely to provide additional information relating to technical features of one or more embodiments, which information may not be completely disclosed in the wording in the pages of this application.

Words relating to the opinions and judgments of the author of all patents, patent applications, patent publications, and other documents cited herein and not directly relating to the technical details of the description of the embodiments therein are not incorporated by reference.

The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more embodiments of the patents, patent applications, patent publications, and other documents, are not considered to be incorporated by reference herein for any of the patents, patent applications, patent publications, and other documents cited herein.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications, patent publications, and other documents cited herein may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A proppant-handling arrangement configured to reduce silicosis, pneumoconiosis, or other diseases caused and/or exacerbated by inhalation of dust generated during a hydraulic fracturing operation by the handling of proppant, said arrangement comprising:
    a proppant storage device to store proppant received from a pneumatic delivery arrangement;
    said proppant storage device comprising a connector to connect to said pneumatic delivery arrangement during pneumatic filling of said proppant storage device with proppant, which pneumatic filling generates dust clouds in said proppant storage device;
    a first vacuum arrangement comprising a first vacuum inlet, disposed on or in an upper portion of said proppant storage device, to suck away at least a portion of a first dust cloud formed upon pneumatic filling of said proppant storage device;
    a powered vacuum suction system;
    a first air duct system;
    said first vacuum arrangement being connected to said powered vacuum suction system by said first air duct system;
    a conveyor belt arrangement comprising a conveyor belt to transport proppant received from said proppant storage device;
    said proppant storage device comprising a transfer portion disposed above said conveyor belt to drop proppant onto said conveyor belt, which dropping of proppant generates dust clouds at said conveyor belt arrangement;
    a second vacuum arrangement comprising a second vacuum inlet, disposed at said conveyor belt arrangement, to suck away at least a portion of a second dust cloud formed upon transfer of proppant onto said conveyor belt;
    a second air duct system;
    said second vacuum arrangement being connected to said powered vacuum suction system by said second air duct system;
    a blender to mix proppant received from said conveyor belt arrangement with proppant-conducting material to form a proppant mixture;
    said conveyor belt arrangement comprising a transfer portion disposed above said blender to drop proppant into said blender, which dropping of proppant generates dust clouds at said blender;
    a third vacuum arrangement comprising a third vacuum inlet, disposed at said blender, to suck away at least a portion of a third dust cloud formed upon transfer of proppant into said blender;
    a third air duct system;
    said third vacuum arrangement being connected to said powered vacuum suction system by said third air duct system;
    said powered vacuum suction system comprises a vacuum dust collection machine to generate a vacuum, in said air duct systems and said vacuum arrangements, sufficient to:
        suck away at least a portion of a first dust cloud, formed upon pneumatic filling of said proppant storage device, to thereby minimize escape of dust into the surrounding atmosphere;
        suck away at least a portion of a second dust cloud, formed upon transfer of proppant onto said conveyor belt, to thereby minimize escape of dust into the surrounding atmosphere; and
        suck away at least a portion of a third dust cloud, formed upon transfer of proppant into said blender, to thereby minimize escape of dust into the surrounding atmosphere; and
    said powered vacuum suction system comprising a dust collection container to collect dust from air suctioned through said air duct systems and said vacuum arrangements from said proppant storage device, said conveyor belt arrangement, and said blender.

2. The proppant-handling arrangement according to claim 1, wherein said proppant storage device comprises a proppant storage trailer.

3. The proppant-handling arrangement according to claim 1, wherein said proppant storage device comprises an opening therein, through which air and dust can pass during pneumatic filling, and said first vacuum inlet is disposed at said opening.

4. The proppant-handling arrangement according to claim 3, wherein said first vacuum arrangement comprises a cover structure disposed to cover said opening in said proppant storage device.

5. The proppant-handling arrangement according to claim 1, wherein said transfer portion of said proppant storage device comprises a conveyor belt.

6. The proppant-handling arrangement according to claim 1, wherein said first air duct system comprises a plurality of said first vacuum inlets disposed on or in an upper portion of said proppant storage device to collect dust at different sections of said proppant storage device.

7. The proppant-handling arrangement according to claim 6, wherein said first air duct system comprises at least one flexible hose arrangement operatively connected to said first vacuum inlets.

8. The proppant-handling arrangement according to claim 1, wherein said second air duct system comprises a plurality of said second vacuum inlets disposed at said conveyor belt arrangement to collect dust at different sections of said conveyor belt arrangement.

9. The proppant-handling arrangement according to claim 8, wherein said second air duct system comprises at least one flexible hose arrangement operatively connected to said second vacuum inlets.

10. The proppant-handling arrangement according to claim 9, wherein:
    said second air duct system comprises at least one manifold; and
    said at least one flexible hose arrangement comprises a plurality of flexible hoses which connect said second vacuum inlets to said manifold.

11. The proppant-handling arrangement according to claim 1, wherein said transfer portion of said conveyor belt arrangement comprises an inclined conveyor belt.

12. The proppant-handling arrangement according to claim 1, wherein said third air duct system comprises a flexible hose operatively connected to said third vacuum inlet.

13. A proppant-handling arrangement configured to reduce silicosis, pneumoconiosis, or other diseases caused and/or exacerbated by inhalation of dust generated during a hydraulic fracturing operation by the handling of proppant, said arrangement comprising:
    a proppant storage device to store proppant pneumatically filled by a pneumatic delivery arrangement, which pneumatic filling generates dust clouds in said proppant storage device;
    a first vacuum arrangement comprising a first vacuum inlet disposed at said proppant storage device;
    a powered vacuum suction system;
    a first air duct system;
    said first vacuum arrangement being connected to said powered vacuum suction system by said first air duct system;
    a conveyor belt arrangement to transport proppant received from said proppant storage device;
    said proppant storage device being configured to transfer proppant to said conveyor belt arrangement, which transfer of proppant generates dust clouds at said conveyor belt arrangement;
    a second vacuum arrangement comprising a second vacuum inlet disposed at said conveyor belt arrangement;
    a second air duct system;
    said second vacuum arrangement being connected to said powered vacuum suction system by said second air duct system;
    a blender to mix proppant received from said conveyor belt arrangement with proppant-conducting material to form a proppant mixture;
    said conveyor belt arrangement being configured to transfer proppant into said blender, which transfer of proppant generates dust clouds at said blender;
    a third vacuum arrangement comprising a third vacuum inlet disposed at said blender;
    a third air duct system;
    said third vacuum arrangement being connected to said powered vacuum suction system by said third air duct system;
    said powered vacuum suction system comprises a vacuum dust collection machine to generate a vacuum, in said air duct systems and said vacuum arrangements, sufficient to:
        suck away at least a portion of a first dust cloud, formed upon filling of said proppant storage device, to thereby minimize escape of dust into the surrounding atmosphere;
        suck away at least a portion of a second dust cloud, formed upon transfer of proppant onto said conveyor belt, to thereby minimize escape of dust into the surrounding atmosphere; and
        suck away at least a portion of a third dust cloud, formed upon transfer of proppant into said blender, to thereby minimize escape of dust into the surrounding atmosphere; and
    said powered vacuum suction system comprising a dust collection container to collect dust from air suctioned through said air duct systems and said vacuum arrangements from said proppant storage device, said conveyor belt arrangement, and said blender.

14. The proppant-handling arrangement according to claim 13, wherein said proppant storage device comprises a proppant storage trailer.

15. The proppant-handling arrangement according to claim 13, wherein:
    said proppant storage device comprises an opening therein, through which air and dust can pass during pneumatic filling, and said first vacuum inlet is disposed at said opening; and
    said first vacuum arrangement comprises a cover structure disposed to cover said opening in said proppant storage device.

16. The proppant-handling arrangement according to claim 13, wherein said proppant storage device comprises a conveyor belt to transfer proppant to said conveyor.

17. The proppant-handling arrangement according to claim 13, wherein said first air duct system comprises a plurality of vacuum inlets disposed on or in an upper portion of said proppant storage device to collect dust at different sections of said proppant storage device.

18. The proppant-handling arrangement according to claim 13, wherein said second air duct system comprises a plurality of vacuum inlets disposed at said conveyor belt arrangement to collect dust at different sections of said conveyor belt arrangement.

19. The proppant-handling arrangement according to claim 18, wherein said second air duct system comprises at least one manifold operatively connected to said vacuum inlets.

20. A proppant-handling arrangement configured to reduce silicosis, pneumoconiosis, or other diseases caused and/or exacerbated by inhalation of dust generated during a hydraulic fracturing operation by the handling of proppant, said arrangement comprising:
    a proppant storage device;
    a first vacuum arrangement disposed at said proppant storage device;
    a powered vacuum suction system;
    a first air duct system;
    said first vacuum arrangement being connected to said powered vacuum suction system by said first air duct system;

a conveyor to transport proppant received from said proppant storage device;

said proppant storage device being configured to transfer proppant to said conveyor;

a second vacuum arrangement disposed at said conveyor;

a second air duct system;

said second vacuum arrangement being connected to said powered vacuum suction system by said second air duct system;

a blender to mix proppant received from said conveyor with proppant-conducting material to form a proppant mixture;

said conveyor being configured to transfer proppant into said blender;

a third vacuum arrangement disposed at said blender;

a third air duct system;

said third vacuum arrangement being connected to said powered vacuum suction system by said third air duct system;

said powered vacuum suction system comprises a vacuum dust collection machine to generate a vacuum, in said air duct systems and said vacuum arrangements, sufficient to:

suck away at least a portion of a first dust cloud, formed upon filling of said proppant storage device, to thereby minimize escape of dust into the surrounding atmosphere;

suck away at least a portion of a second dust cloud, formed upon transfer of proppant onto said conveyor, to thereby minimize escape of dust into the surrounding atmosphere; and suck away at least a portion of a third dust cloud, formed upon transfer of proppant into said blender, to thereby minimize escape of dust into the surrounding atmosphere; and said powered vacuum suction system comprising a dust collection container to collect dust from air suctioned through said air duct systems and said vacuum arrangements from said proppant storage device, said conveyor, and said blender.

* * * * *